(12) United States Patent
Aoyagi

(10) Patent No.: US 10,161,337 B2
(45) Date of Patent: Dec. 25, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Shinsuke Aoyagi, Isehara (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 387 days.

(21) Appl. No.: 14/991,118

(22) Filed: Jan. 8, 2016

(65) Prior Publication Data
US 2016/0201589 A1    Jul. 14, 2016

(30) Foreign Application Priority Data

Jan. 14, 2015   (JP) ................................. 2015-005272

(51) Int. Cl.
*F02D 41/14* (2006.01)
*F02B 33/40* (2006.01)
(Continued)

(52) U.S. Cl.
CPC .......... *F02D 41/1477* (2013.01); *F02B 33/40* (2013.01); *F02B 37/22* (2013.01);
(Continued)

(58) Field of Classification Search
CPC .. F02D 41/1477; F02D 41/0077; F02D 41/26; F02D 41/0002; F02D 41/1401;
(Continued)

(56) References Cited

U.S. PATENT DOCUMENTS 4,306,529 A * 12/1981 Chiesa ................ F02D 41/2445
                                                                    123/674
4,745,899 A *  5/1988 Kiuchi .................. F02D 31/002
                                                                    123/339.22
(Continued)

FOREIGN PATENT DOCUMENTS

EP        0816 658 A    1/1998
EP    2 642 102 A1   11/2010
(Continued)

*Primary Examiner* — Sizo Vilakazi
*Assistant Examiner* — Brian Kirby
(74) *Attorney, Agent, or Firm* — Finnegan, Henderson, Farabow, Garrett & Dunner, LLP

(57) ABSTRACT

A control device for an internal combustion engine includes an electronic control unit configured to switch a control algorithms for a calculation of a command value of the actuator between a first control algorithm and a second control algorithm. The electronic control unit is configured to calculate a value obtained by adding a value of a term of the second control algorithm changing in accordance with the deviation calculated in a present control cycle to the command value calculated in a previous control cycle in accordance with the first control algorithm as a value of the command value calculated in the present control cycle in a first control cycle after switching from the first control algorithm to the second control algorithm. The value of the term changing in accordance with the deviation includes an update amount of an I term of the I control calculated in the present control cycle.

10 Claims, 13 Drawing Sheets

(51) Int. Cl.
| | | |
|---|---|---|
| *F02B 37/22* | (2006.01) | |
| *F02D 41/00* | (2006.01) | |
| *F02D 41/26* | (2006.01) | |
| *F02D 41/24* | (2006.01) | |

(52) U.S. Cl.
CPC ..... *F02D 41/0002* (2013.01); *F02D 41/0007* (2013.01); *F02D 41/0077* (2013.01); *F02D 41/1401* (2013.01); *F02D 41/26* (2013.01); *F02D 41/2422* (2013.01); *F02D 2041/0017* (2013.01); *F02D 2041/0022* (2013.01); *F02D 2041/141* (2013.01); *F02D 2041/1409* (2013.01); *F02D 2041/1418* (2013.01); *F02D 2200/0406* (2013.01); *Y02T 10/144* (2013.01); *Y02T 10/42* (2013.01)

(58) Field of Classification Search
CPC ......... F02D 41/0007; F02D 2041/0017; F02D 2041/1418; F02D 2041/141; F02D 2041/0022; F02D 2041/1409; F02D 41/2422; F02D 2200/0406; F02B 37/22; F02B 33/40; Y02T 10/144; Y02T 10/42
USPC ........................................................ 701/108
See application file for complete search history.

(56) References Cited

U.S. PATENT DOCUMENTS

| | | | | |
|---|---|---|---|---|
| 4,770,140 A * | 9/1988 | Kiuchi | F02D 31/002 | 123/339.21 |
| 4,771,749 A * | 9/1988 | Kiuchi | F02D 31/002 | 123/339.21 |
| 4,964,386 A * | 10/1990 | Akiyama | F02D 31/005 | 123/179.18 |
| 4,999,781 A * | 3/1991 | Holl | F02D 41/0052 | 123/674 |
| 5,113,823 A * | 5/1992 | Iriyama | F02D 11/107 | 123/361 |
| 5,224,853 A * | 7/1993 | Kazuo | F02B 37/18 | 60/602 |
| 5,261,236 A * | 11/1993 | Ironside | F02D 41/0007 | 123/399 |
| 5,313,395 A * | 5/1994 | Kawai | F02D 31/005 | 123/339.23 |
| 5,343,846 A * | 9/1994 | Ogawa | F02D 41/0045 | 123/520 |
| 5,391,127 A * | 2/1995 | Nishimura | F02D 11/105 | 123/350 |
| 5,429,089 A * | 7/1995 | Thornberg | F02D 31/001 | 123/352 |
| 5,449,495 A * | 9/1995 | Goto | B01D 53/30 | 422/111 |
| 5,638,801 A * | 6/1997 | Maki | F02D 41/1402 | 123/674 |
| 5,669,368 A * | 9/1997 | Maki | F02D 41/1402 | 123/681 |
| 5,762,055 A * | 6/1998 | Yamashita | F02D 37/02 | 123/677 |
| 5,781,875 A * | 7/1998 | Maki | F02D 41/008 | 123/480 |
| 5,908,463 A * | 6/1999 | Akazaki | F02D 41/008 | 123/480 |
| 5,934,249 A * | 8/1999 | Nanba | F02D 41/0052 | 123/350 |
| 6,009,862 A * | 1/2000 | Wanat | F02D 41/0072 | 123/568.21 |
| 6,019,093 A | 2/2000 | Kitagawa | | |
| 6,161,383 A | 12/2000 | Aschner et al. | | |
| 6,279,532 B1 * | 8/2001 | Takano | F02D 41/061 | 123/357 |
| 6,360,159 B1 * | 3/2002 | Miller | F02D 41/005 | 123/674 |
| 6,564,774 B2 * | 5/2003 | Ellims | F02D 31/001 | 123/352 |
| 6,622,080 B2 * | 9/2003 | Yang | F02D 11/105 | 123/399 |
| 6,672,060 B1 * | 1/2004 | Buckland | F02D 23/005 | 123/564 |
| 7,017,550 B2 * | 3/2006 | Hata | F02D 11/105 | 123/399 |
| 7,205,842 B2 * | 4/2007 | Gustavsson | H04W 52/08 | 330/279 |
| 7,681,540 B2 * | 3/2010 | Watanabe | F01L 1/3442 | 123/90.15 |
| 7,720,591 B2 * | 5/2010 | Takamiya | F01L 1/34 | 123/399 |
| 8,104,457 B2 * | 1/2012 | Ide | F02D 41/0052 | 123/568.18 |
| 8,820,297 B2 * | 9/2014 | Iwatani | F02D 41/0007 | 123/348 |
| 2003/0098014 A1 | 5/2003 | Yokoyama et al. | | |
| 2004/0193356 A1 * | 9/2004 | Kawai | F02D 11/10 | 701/103 |
| 2005/0161022 A1 * | 7/2005 | Kishi | F02D 31/002 | 123/353 |
| 2005/0278103 A1 * | 12/2005 | Higashimata | F16H 61/143 | 701/67 |
| 2007/0186908 A1 * | 8/2007 | Fukasawa | F02D 41/08 | 123/458 |
| 2009/0018756 A1 * | 1/2009 | Storhok | F02D 41/0007 | 701/105 |
| 2009/0218710 A1 * | 9/2009 | Hakoda | B29C 45/77 | 264/40.5 |
| 2011/0017172 A1 * | 1/2011 | Shigenaga | F02D 13/0265 | 123/406.26 |
| 2011/0036086 A1 * | 2/2011 | Liu | F02D 41/0007 | 60/602 |
| 2011/0043157 A1 * | 2/2011 | Yuasa | B60N 2/0232 | 318/599 |
| 2011/0192161 A1 | 8/2011 | Takahaski et al. | | |
| 2012/0285420 A1 * | 11/2012 | Iwatani | F02D 41/0007 | 123/348 |
| 2014/0225540 A1 * | 8/2014 | Omata | H02P 6/002 | 318/400.07 |
| 2014/0303877 A1 * | 10/2014 | Aoyagi | G05B 11/42 | 701/104 |
| 2014/0316675 A1 * | 10/2014 | Buckland | F02B 37/12 | 701/103 |

FOREIGN PATENT DOCUMENTS

| | | | |
|---|---|---|---|
| JP | H06288284 A | 10/1994 | |
| JP | 08144809 A * | 6/1996 | |
| JP | H08144809 A * | 6/1996 | .......... Y10T 10/144 |
| JP | 2003-166445 | 6/2003 | |
| JP | 2005-055952 A | 3/2005 | |
| JP | 2006-275172 | 10/2006 | |
| JP | 2007-218144 | 8/2007 | |
| JP | 2010-090780 A | 4/2010 | |
| JP | 2014-202085 A | 10/2014 | |
| WO | WO 2012/066684 A1 | 5/2012 | |

* cited by examiner

US 10,161,337 B2

CONTROL DEVICE FOR INTERNAL COMBUSTION ENGINE

INCORPORATION BY REFERENCE

The disclosure of Japanese Patent Application No. 2015-005272 filed on Jan. 14, 2015 including the specification, drawings and abstract is incorporated herein by reference in its entirety.

BACKGROUND OF THE INVENTION

1. Field of the Invention

The invention relates to a control device for an internal combustion engine and, more particularly, to a control device that switches control algorithms of an actuator constituting the internal combustion engine between two control algorithms.

2. Description of Related Art

Various actuators such as a throttle, an EGR valve, and a variable nozzle are disposed in an internal combustion engine, and an operation of the internal combustion engine is controlled based on operations of these actuators. These actuators have operation amounts that continuously vary or vary in stages. Command values that determine the operation amounts are calculated by a control device. The calculation of the command values is performed in accordance with control algorithms of the actuators. In a case where the actuator is controlled by a feedforward control (hereinafter, referred to as an FF control) and a feedback control (hereinafter, referred to as an FB control), for example, the command value is calculated as the sum of a feedforward term (hereinafter, referred to as an FF term) and a feedback term (hereinafter, referred to as an FB term). Specifically, the FB term is any one of a P term, an I term, and a D term or a combination thereof.

In some cases, a plurality of the control algorithms are selectively applied to one of the actuators. Switching from one of the control algorithms to another control algorithm results in switching of command value calculation methods, and thus the command value might go through a sudden change immediately after the switching. The sudden change in the command value for the actuator gives rise to a fluctuation in a control amount controlled by the operation of the actuator. The change in the command value may be suppressed by filter processing and averaging processing when only the suppression of the sudden change in the command value is intended. In a case where such processing is performed on the command value, however, controllability regarding the control amount itself is reduced. Accordingly, the suppression of the sudden change in the command value that occurs during the switching of the control algorithms without a reduction in the controllability has been pursued for a while.

Japanese Patent Application Publication No. 2007-218144 (JP 2007-218144 A) and Japanese Patent Application Publication No. 2006-275172 (JP 2006-275172 A) disclose techniques for suppressing the sudden change in the command value that occurs during the switching of the control algorithms. Hereinafter, an overview and problems thereof will be described.

JP 2007-218144 A discloses a control device that switches a control algorithm of a high-pressure pump of a fuel injection system between an FF-FB combination control in which an FF control and an FB control are used in combination and an FB single control in which only the FB control is executed. This control device is configured to set an FF term for the FF control prior to switching as an initial value of an I term for the FB control after switching during the switching from the FF-FB combination control to the FB single control. In addition, this control device is configured to set the I term for the FB control as an initial value of the FF term for the FF control after switching during the switching from the FB single control to the FF-FB combination control.

JP 2006-275172 A discloses a control device that switches a control algorithm of a solenoid valve for hydraulic control of a belt-type continuously variable transmission between a first control in which both an FF control and an FB control are executed and a second control in which only the FB control is executed. This control device is configured to add an FF term for the FF control prior to switching and an I term for the FB control at the point in time of switching to each other and set the result as an initial value of the I term for the FB control after switching during the switching from the first control to the second control. In addition, this control device is configured to subtract the FF term for the FF control at the point in time of switching from the I term for the FB control prior to switching and set the result as an initial value of the I term for the FB control after switching during the switching from the second control to the first control.

SUMMARY OF THE INVENTION

However, there is room for improvement with regard to the technique disclosed in JP 2007-218144 A. In the first control cycle after the switching from the FB single control to the FF-FB combination control, the initial value of the FF term for the FF control becomes the value of the I term for the FB control of the previous control cycle. In the subsequent control cycle, however, the value of the FF term for the FF control is set based on a map reflecting a required fuel injection quantity and an engine rotation speed. Accordingly, the FF term for the FF control suddenly changes between the initial control cycle and the subsequent control cycle. Eventually, an instruction value that is given to the solenoid valve might go through a sudden change.

There is room for improvement with regard to the technique disclosed in JP 2006-275172 A, too. In the first control cycle after the switching from the second control to the first control, the initial value of the I term after the switching is obtained based on the subtraction of the FF term for the FF control of the present control cycle from the I term for the FB control of the previous control cycle. However, as a result of the inventor's calculation associated with this the present application, it has been confirmed that the consideration of the I term of the previous control cycle alone during the calculation of the initial value of the I term after the switching is not sufficient to ensure the suppression of a sudden change in the command value. In addition, although the I term is represented by the sum of the previous value and the current update amount (value obtained by multiplying an I gain by a deviation), the current update amount is not reflected in the I term in a case where the initial value of the I term is set as described above. The update amount of the I term is a value that changes in accordance with the deviation and is the amount of change that is required to ensure compliance with a target value by the FB control. Accordingly, in a case where the current update amount is not reflected in the I term, the controllability regarding the control amount is reduced.

In the methods described above, it can be said that the possibility of a sudden change in the instruction value for the actuator still remains at least during the switching from the control algorithm including only the FB control to the control algorithm including the FF control and the FB control.

The inventor of the present application has recognized the above-described problems associated with the switching of the control algorithms in a generalized manner and examined the suppression of a sudden change in a command value given to an actuator entailing no reduction in controllability with regard to switching from a certain control algorithm (not limited to a control algorithm including only an FB control) to a control algorithm including at least the FB control. The invention is derived from this examination.

The invention provides a control device for an internal combustion engine that is capable of suppressing a sudden change in a command value given to an actuator which is attributable to control algorithm switching while entailing no reduction in controllability regarding a control amount.

According to an aspect of the invention, a control device for an internal combustion engine is provided. The internal combustion engine includes an actuator. The control device includes an electronic control unit. The electronic control unit is configured to calculate a command value given to the actuator at a predetermined control cycle in accordance with a first control algorithm. The electronic control unit is configured to calculate the command value given to the actuator at the control cycle in accordance with a second control algorithm differing from the first control algorithm. The second control algorithm includes a feedback control including an I control and being in accordance with a deviation between a target value and a current value. The electronic control unit is configured to switch the control algorithms for the calculation of the command value of the actuator between the first control algorithm and the second control algorithm. The electronic control unit is configured to calculate a value obtained by adding a value of a term of the second control algorithm changing in accordance with the deviation calculated in a present control cycle to the command value calculated in a previous control cycle in accordance with the first control algorithm as a value of the command value calculated in the present control cycle in a first control cycle after switching from the first control algorithm to the second control algorithm. The value of the term changing in accordance with the deviation calculated in the present control cycle includes an update amount of an I term of the I control calculated in the present control cycle. The feedback control of the second control algorithm includes at least the I control. However, the feedback control of the second control algorithm may also include a P control and a D control. In addition, the second control algorithm may include an FF control.

In the first control cycle after the switching from the first control algorithm to the second control algorithm, the value obtained by adding the current value of the term included in the feedback control and changing in accordance with the deviation (hereinafter, referred to as a deviation-dependent term) to the previous value of the command value calculated in accordance with the first control algorithm (that is, the command value of the previous control cycle) is calculated as the current value of the command value. At least the update amount of the I term of the I control is included in the deviation-dependent term.

In the control device of this aspect, the second control algorithm may include a feedforward control. The electronic control unit may be configured to calculate a value obtained by subtracting a current value of a feedforward term of the feedforward control from the command value calculated in the previous control cycle in accordance with the first control algorithm as a previous value of the I term of the I control and as the value of the command value calculated in the present control cycle in the first control cycle after the switching from the first control algorithm to the second control algorithm. According to this aspect, an FF term-offset value obtained by adding the previous value of the command value calculated in accordance with the first control algorithm and the current value of the deviation-dependent term including at least the update amount of the I term to each other is calculated as the current value of the command value. The FF term is not necessarily a variable changing in accordance with an input. The FF term may be a fixed value (that is, content of the FF control is not limited).

In the first control cycle after the switching from the first control algorithm to the second control algorithm, the value obtained by adding the current value of the deviation-dependent term included in the feedback control to the previous value of the command value calculated in accordance with the first control algorithm (that is, the command value of the previous control cycle) may be configured to be calculated as the current value of the command value. In a case where the feedback control of the second control algorithm includes the I control, the update amount of the I term of the I control may be included in the deviation-dependent term. In a case where the feedback control includes the P control, a P term of the P control may be included in the deviation-dependent term. In a case where the feedback control includes the D control, a D term of the D control may be included in the deviation-dependent term.

According to the control device of the above-described aspect, the value obtained by adding the current value of the deviation-dependent term included in the FB control to the previous value of the command value calculated in accordance with the first control algorithm is calculated as the current value of the command value during the switching from the first control algorithm to the second control algorithm including at least the FB control, and thus a sudden change in the command value given to the actuator that is attributable to the switching of the control algorithms can be suppressed without a reduction in controllability regarding the control amount. The actuator may be a throttle placed in an intake passage of a compression ignition-type internal combustion engine. The actuator may be an actuator controlling a flow rate of exhaust gas flowing into a turbine of a turbocharger of the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to accompanying drawings. The invention is not limited to the numbers regarding the elements of the invention in the following description, such as the numbers, quantities, amounts, ranges, and the like of the elements, unless otherwise mentioned or unless the numbers are clearly specified in principle. The structures, steps, and the like in the following description are not essential for the invention unless otherwise mentioned or unless clearly specified as essential in principle.

Figure 1:
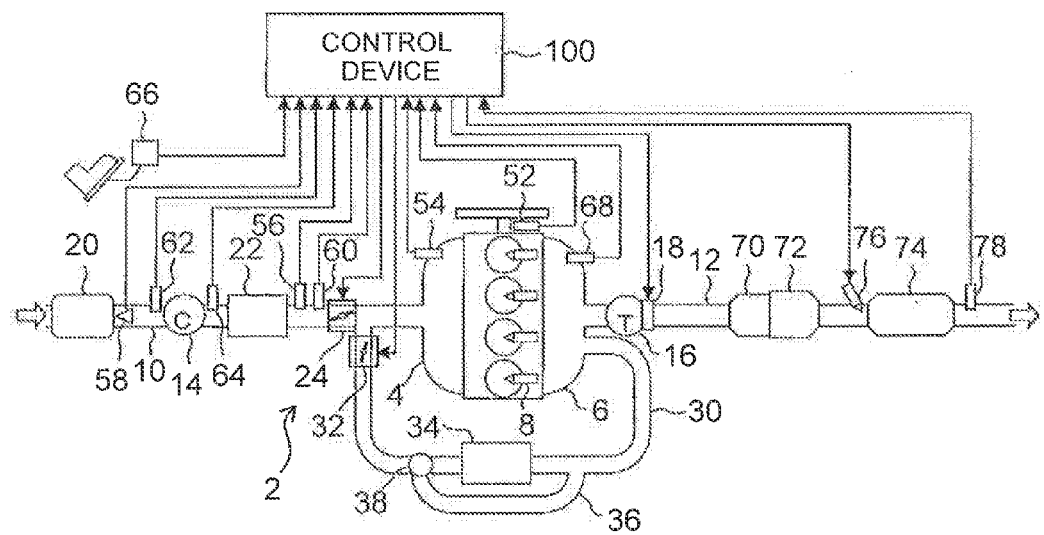
FIG. 1 is a drawing illustrating a configuration of an engine system according to an embodiment of the invention.

FIG. 1 is a drawing illustrating a configuration of an engine system according to an embodiment of the invention. An internal combustion engine according to this embodiment is a turbocharger-attached compression ignition-type internal combustion engine (hereinafter, simply referred to as an engine). Four cylinders are disposed in series in the engine 2, and injectors 8 are disposed for the respective cylinders. An intake manifold 4 and an exhaust manifold 6 are attached to the engine 2. An intake passage 10, through which air (fresh air) blowing from an air cleaner 20 flows, is connected to the intake manifold 4. A compressor 14 of the turbocharger is attached to the intake passage 10. In the intake passage 10, a throttle 24 is disposed further downstream than the compressor 14. In the intake passage 10, an intercooler 22 is disposed between the compressor 14 and the throttle 24. An exhaust passage 12 that releases exhaust gas to the atmosphere is connected to the exhaust manifold 6. A turbine 16 of the turbocharger is attached to the exhaust passage 12. A variable nozzle 18 is disposed in the turbine 16.

The engine 2 is provided with an EGR device that recirculates the exhaust gas from an exhaust system to an intake system. The EGR device connects a position of the intake passage 10 on the downstream side of the throttle 24 to the exhaust manifold 6 by an EGR passage 30. An EGR valve 32 is disposed in the EGR passage 30. In the EGR passage 30, an EGR cooler 34 is disposed further on the exhaust side than the EGR valve 32. A bypass passage 36 that bypasses the EGR cooler 34 is disposed in the EGR passage 30. A bypass valve 38 is disposed at a place where the EGR passage 30 and the bypass passage 36 merge with each other. The bypass valve 38 changes the ratio between the flow rate of the exhaust gas that flows through the EGR cooler 34 and the flow rate of the exhaust gas that flows through the bypass passage 36.

The engine 2 is provided with an exhaust gas control apparatus for exhaust gas purification. The exhaust gas control apparatus is disposed further downstream than the turbine 16 in the exhaust passage 12. The exhaust gas control apparatus includes a diesel oxidation catalyst (DOC) 70, a diesel particulate filter (DPF) 72, and a selective catalytic reduction (SCR) 74 that are arranged in this order from the upstream side of the exhaust passage 12. A urea addition valve 76 is disposed at an inlet of the SCR 74.

Sensors for obtaining information relating to operating states of the engine 2 are attached throughout the engine 2. An air flow meter 58, which measures the flow rate of the fresh air blowing into the intake passage 10, is attached to the intake passage 10 on the downstream side of the air cleaner 20. Pressure sensors 62, 64 are attached on the upstream and downstream sides of the compressor 14, respectively. A pressure sensor 56 and a temperature sensor 60 are attached between the intercooler 22 and the throttle 24. Pressure sensors 54, 68 are attached to the intake manifold 4 and the exhaust manifold 6, respectively. In the exhaust passage 12, an NOx sensor 78 for measuring the concentration of NOx contained in the exhaust gas is attached on the downstream side of the SCR 74. In addition, a crank angle sensor 52 for crankshaft rotation detection, an accelerator opening degree sensor 66 that outputs a signal in accordance with an opening degree of an accelerator pedal, and the like are disposed.

These above-described sensors and actuators are electrically connected to a control device 100. The control device 100 is an electronic control unit. The control device 100 controls the entire system of the engine 2 and has a computer including a CPU, a ROM, and a RAM as a main component. Various control routines (described later) are stored in the ROM. These routines are executed by the control device 100 and the actuators are operated based on signals from the sensors. Then, the engine 2 is subjected to operation control.

The control device 100 operates the actuators by giving command values to the actuators. The command values for the actuators are calculated in accordance with predetermined control algorithms determined for the respective actuators. In some cases, a plurality of the control algorithms are selectively applied to one of the actuators depending on a role of the actuator. In the engine 2 according to this embodiment, the plurality of control algorithms are applied to at least the throttle 24, the variable nozzle 18, the EGR valve 32, the bypass valve 38, and the urea addition valve 76. In a case where the plurality of control algorithms are applied to the single actuator, command value calculation methods are switched as a result of switching of the control algorithms. When the calculation method is changed, the command value might go through a sudden change through the switching. Accordingly, a measure for preventing the sudden change in the command value for the actuator during the switching of the control algorithms is implemented in the control device 100. This will be described in detail below with regard to each of the actuators.

An operation of the throttle 24 is performed under the throttle anterior/posterior differential pressure control and fresh air amount control described below.

The throttle anterior/posterior differential pressure control is control for operating the throttle 24 such that the differential pressure between upstream pressure and downstream pressure of the throttle 24 (referred to as a throttle anterior/posterior differential pressure) corresponds to a target differential pressure. A control amount pertaining to the throttle anterior/posterior differential pressure control is the throttle anterior/posterior differential pressure and an operation amount pertaining thereto is the closing degree of the throttle 24, more specifically, the closing degree with respect to a fully-open position pertaining to a case where the fully-open position is a basic position. The control algorithm of the throttle anterior/posterior differential pressure control consists of an FF control.

In the FF control of the throttle anterior/posterior differential pressure control, the closing degree of the throttle 24 as a command value is calculated based on a target throttle anterior/posterior differential pressure, a fresh air amount (current fresh air amount) that is measured by the air flow meter 58, the throttle upstream pressure that is measured by the pressure sensor 56, and a throttle upstream temperature that is measured by the temperature sensor 60. The closing degree of the throttle 24 is calculated by the use of a model formula of the throttle 24 (such as a throttle formula) or a map which is drawn up based on data obtained by adaptation. The operation of the throttle 24 during the throttle anterior/posterior differential pressure control is carried out in combination with an operation of the EGR valve 32 based on EGR rate control (described later). The target throttle anterior/posterior differential pressure is set for a differential pressure required for the EGR rate control to be ensured between the upstream and downstream sides of the EGR valve 32.

The fresh air amount control is control for operating the throttle 24 such that the amount of the fresh air passing through the throttle 24 corresponds to a target fresh air amount. A control amount pertaining to the fresh air amount control is the fresh air amount and an operation amount pertaining thereto is the closing degree of the throttle 24. The control algorithm of the fresh air amount control consists of an FF control and an FB control.

In the FF control of the fresh air amount control, an FF term of the throttle closing degree is calculated based on the target fresh air amount, the throttle upstream temperature that is measured by the temperature sensor 60, the throttle upstream pressure that is measured by the pressure sensor 56, an intake manifold pressure (throttle downstream pressure) that is measured by the pressure sensor 54, and the fresh air amount (current fresh air amount) that is measured by the air flow meter 58. The calculation of the FF term is performed by the use of the model formula of the throttle 24 (such as the throttle formula) or a map which is drawn up based on data obtained by adaptation.

The FB control of the fresh air amount control is a PID control, in which an FB term of the throttle closing degree is calculated based on the deviation between the target fresh air amount and the current fresh air amount. The FB term consists of a P term, an I term, and a D term. It is the I term that is particularly important among these terms. Accordingly, the FB control does not necessarily have to be the PID control, and it is preferable that at least I control is included therein. The sum of the FF term and the FB term is set as the command value for the throttle 24. The target fresh air amount is determined from a map based on a fuel injection quantity and an engine rotation speed. The operation of the throttle 24 based on the fresh air amount control is carried out in combination with an operation of the EGR valve 32 based on EGR valve anterior/posterior differential pressure control (described later).

Figure 2:
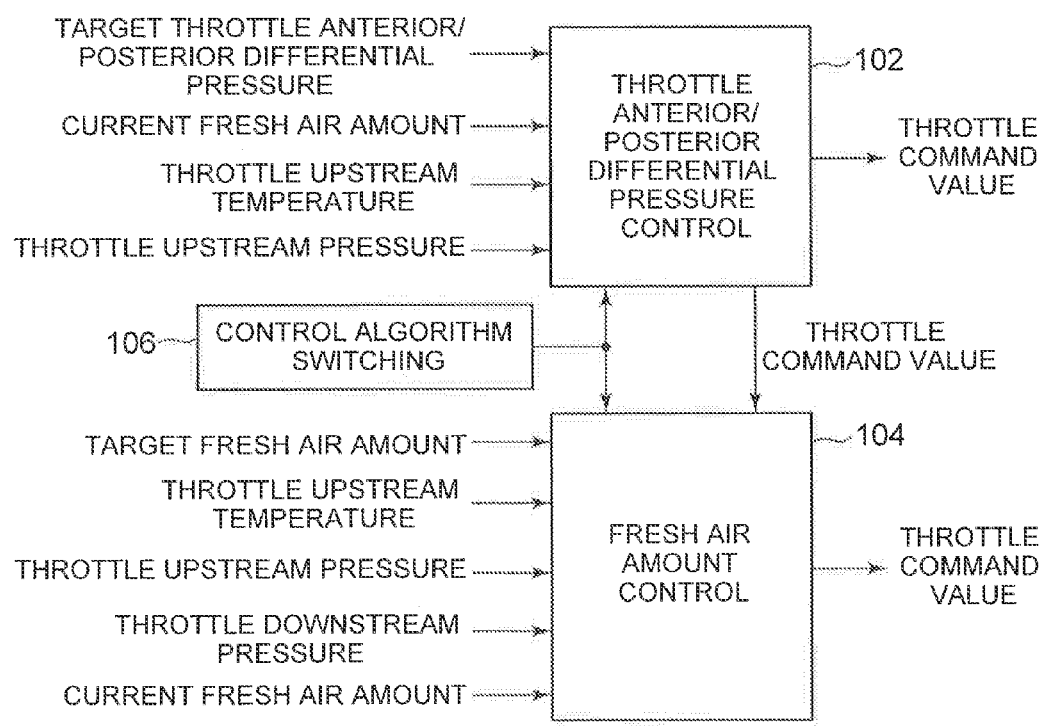
FIG. 2 is a drawing illustrating a control structure regarding a throttle operation of a control device according to the embodiment of the invention.

FIG. 2 is a block diagram illustrating a control structure of the control device 100 that is associated with the operation of the throttle 24. The control structure that is illustrated in FIG. 2 includes a throttle anterior/posterior differential pressure control unit 102 as first calculating means, a fresh air amount control unit 104 as second calculating means, and a control algorithm switching unit 106 as control algorithm switching means. The throttle anterior/posterior differential pressure control unit 102 calculates the command value for the throttle 24 in accordance with the control algorithm of the throttle anterior/posterior differential pressure control described above. The fresh air amount control unit 104 calculates the command value for the throttle 24 in accordance with the control algorithm of the fresh air amount control described above.

The control algorithm switching unit 106 selects the control algorithm applied to the throttle 24 and instructs the throttle anterior/posterior differential pressure control unit 102 and the fresh air amount control unit 104 in accordance with a result of the selection. In a case where the fresh air amount control is selected, the control algorithm switching unit 106 instructs the throttle anterior/posterior differential pressure control unit 102 to stop the calculation of the command value and instructs the fresh air amount control unit 104 to initiate the calculation of the command value. When instructed to stop the calculation of the command value, the throttle anterior/posterior differential pressure control unit 102 stops the calculation of the command value and gives the latest command value to the fresh air amount control unit 104. When instructed to initiate the calculation of the command value, the fresh air amount control unit 104 initiates the calculation of the command value by using the command value given by the throttle anterior/posterior differential pressure control unit 102 (previous value of the command value). In a case where the throttle anterior/posterior differential pressure control is selected, the control algorithm switching unit 106 instructs the fresh air amount control unit 104 to stop the calculation of the command value and instructs the throttle anterior/posterior differential pressure control unit 102 to initiate the calculation of the command value. In this case, the throttle anterior/posterior differential pressure control unit 102 and the fresh air amount control unit 104 do not exchange the previous value of the command value with each other. The calculation of the command value during the switching of the control algorithms will be described in detail later with reference to a flowchart.

These units 102, 104, 106 of the control device 100 are correlated with a throttle operation routine stored in the ROM of the control device 100. When this routine is read from the ROM and executed by the CPU, functions of these units 102, 104, 106 are realized in the control device 100.

Figure 3:
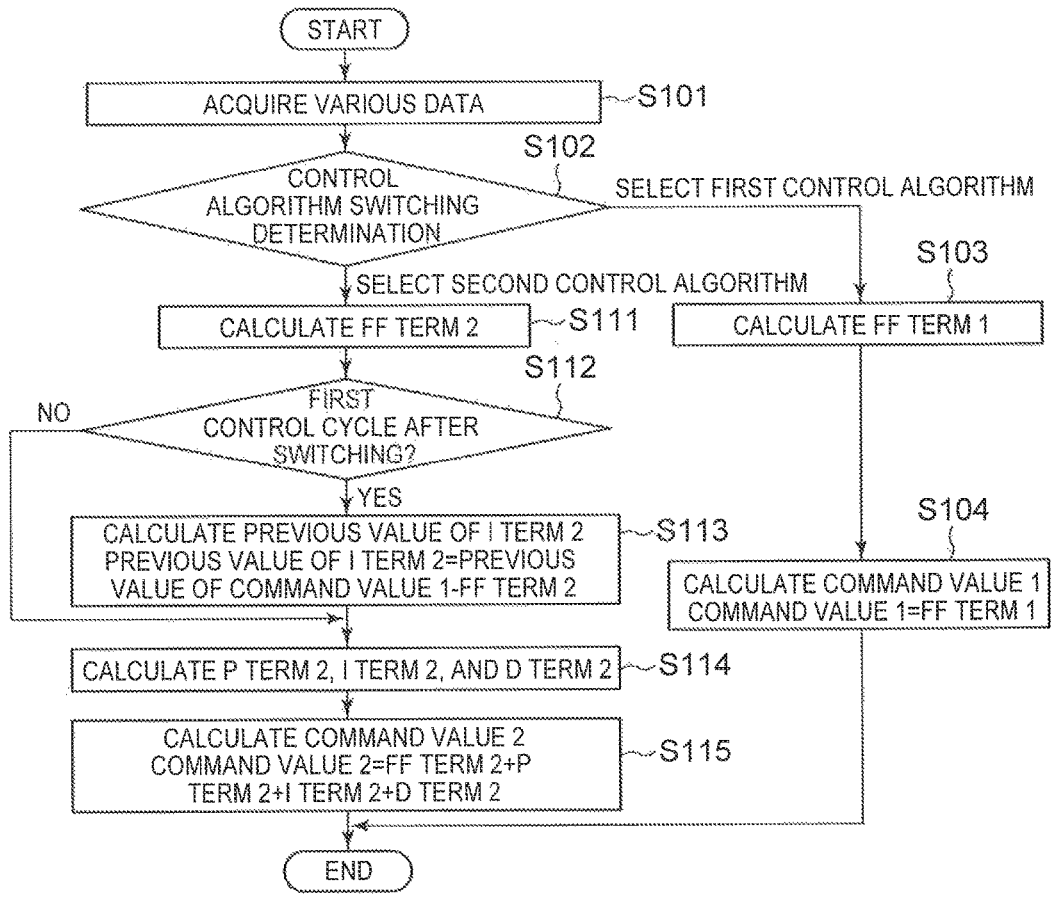
FIG. 3 is a flowchart illustrating a routine of the throttle operation.

FIG. 3 is a flowchart illustrating the routine for realizing the functions of the units 102, 104, 106 relating to the operation of the throttle 24 in the control device 100. The control device 100 executes the routine illustrated in FIG. 3 at a constant control cycle. Hereinafter, processing during the execution of this routine will be described in the order of steps. The actuator in the following description refers to the throttle 24. In addition, the first control algorithm in the following description refers to the control algorithm of the throttle anterior/posterior differential pressure control and the second control algorithm in the following description refers to the control algorithm of the fresh air amount control.

In Step S101, various data required for the calculation of the command value are acquired in accordance with the respective control algorithms.

In Step S102, whether or not to switch the control algorithms is determined based on the operating states of the engine 2. In a case where the first control algorithm is selected in this switching determination, Steps S103 and S104 are executed as the subsequent processing. In a case where the second control algorithm is selected, Steps S111, S112, S113, S114, and S115 are executed or Steps S11, S112, S114, and S115 are executed as the subsequent processing.

In a case where the first control algorithm is selected, Step S103 is executed first. In Step S103, an FF term for the FF control (FF term 1) included in the first control algorithm is calculated.

In Step S104, the command value that is given to the actuator (command value 1) is calculated by the use of the FF term (FF term 1) calculated in Step S103 and the following equation.

Command value 1=FF term 1

In a case where the second control algorithm is selected, Step S111 is executed first. In Step S111, an FF term for the FF control (FF term 2) included in the second control algorithm is calculated.

In Step S112, it is checked whether or not the present control cycle is the first control cycle after the switching of the control algorithms. Step S113 is executed first and then Step S114 is executed when the present control cycle is the first control cycle after the switching to the second control algorithm. Otherwise, Step S14 is executed with Step S113 skipped.

In Step S113, the previous value of an I term for I control (I term 2) included in the second control algorithm is calculated. The previous value of the I term means the I term of the previous control cycle. However, the previous value of the I term does not exist in the first control cycle after the switching because the calculation of the I term is performed after the switching to the second control algorithm. In addition, the I term is a correction term for a steady-state error that is obtained as a result of repetition of the FB control, and thus no reasonable value exists as the previous value of the I term in the first control cycle in which the FB control is initiated. Accordingly, the previous value of the I term that is calculated in this case is merely a virtual previous value. In Step S113, the value that is obtained by subtracting the FF term (FF term 2) which is calculated in Step S111 of the present control cycle from the command value which is calculated in Step S104 of the previous control cycle (previous value of command value 1) is calculated as in the following equation, and the value is set as the previous value of the I term (I term 2) that does not exist in actuality. No matter what value is set as the previous value of the I term, the I term converges to a value corresponding to the steady-state control system error as the FB control is repeated.

Previous value of $I$ term 2=previous value of command value $I$−FF term 2

In Step S114, a P term for P control (P term 2), the I term for I control (I term 2), and a D term for D control (D term 2) included in the second control algorithm are calculated based on the following respective equations. The "deviation" in the following equation means the deviation between a target value and an actual value of the control amount as a controlled object. The control amount is the fresh air amount in the case of the fresh air amount control. "Devia-tion×I gain" is an update amount of the I term. The "previous value of I term 2" is the previous value of the I term calculated in Step S113 in a case where Step S113 is executed and is the I term calculated in Step S114 of the previous control cycle in a case where Step S113 is skipped. Herein, P term 2, I term 2, and D term 2 are calculated based on the following equations.

$P$ term 2=deviation×$P$ gain $I$ term 2=deviation×$I$ gain+previous value of $I$ term 2

$D$ term 2=differential value of deviation×$D$ gain

In Step S115, the command value that is given to the actuator (command value 2) is calculated by the use of the FF term calculated in Step S111 (FF term 2) and the FB terms calculated in Step S114 (P term 2, I term 2, and D term 2) and the following equation.

Command value 2=FF term 2+$P$ term 2+$I$ term 2+$D$ term 2

In a case where Step S113 is executed, that is, in the first control cycle after the switching from the first control algorithm to the second control algorithm, the command value that is given to the actuator (command value 2) is represented by the following equation in the end.

Command value 2=$P$ term 2+update amount of $I$ term 2+$D$ term 2+previous value of command value 1

In this equation, each of P term 2, the update amount of I term 2, and D term 2 is a deviation-dependent term that changes with the deviation. In other words, the command value calculated in the first control cycle (command value 2) becomes the value that is obtained by adding only the deviation-dependent term to the previous value of the command value (command value 1) because the value that is obtained by subtracting the current value of the FF term from the command value calculated in accordance with the first control algorithm (command value 1) becomes the previous value of the I term immediately before the switching.

As a result, the amount of change in the command value (the amount of change in the current value with respect to the previous value) that occurs in the first control cycle after the switching from the first control algorithm to the second control algorithm becomes only the amount of change in accordance with the deviation. Accordingly, a sudden change in the command value given to the actuator before and after the switching of the control algorithms is suppressed. In addition, each of P term 2, the update amount of I term 2, and D term 2, all being deviation-dependent terms, is included in the command value, and thus a reduction in controllability with respect to the control amount is suppressed as well.

The variable nozzle 18 is an actuator that controls the flow rate of the exhaust gas which flows into the turbine 16 of the turbocharger. A wastegate valve is known as an equivalent. In the case of an engine that is provided with the wastegate valve instead of the variable nozzle, the following operation can be applied to the wastegate valve.

An operation of the variable nozzle 18 is performed under the intake manifold pressure control, exhaust manifold pressure control, throttle upstream pressure control, and turbo efficiency control described below.

The intake manifold pressure control is control for operating the variable nozzle 18 so that the intake manifold pressure corresponds to a target intake manifold pressure. A control amount pertaining to the intake manifold pressure control is the intake manifold pressure and an operation amount pertaining thereto is an opening degree of the variable nozzle 18. The control algorithm of the intake manifold pressure control consists of an FF control and an FB control.

In the FF control of the intake manifold pressure control, an FF term of the variable nozzle opening degree is calculated based on the engine rotation speed, the fuel injection quantity, an opening degree of the EGR valve 32, and the closing degree of the throttle 24. The calculation of the FF term is performed by the use of a map which is drawn up based on data obtained by adaptation.

The FB control of the intake manifold pressure control is a PID control, in which an FB term of the opening degree of the variable nozzle 18 is calculated based on the deviation between the target intake manifold pressure and the current intake manifold pressure that is measured by the pressure sensor 54. The sum of the FF term and the FB term is set as the command value for the variable nozzle 18.

The exhaust manifold pressure control is control for operating the variable nozzle 18 such that an exhaust manifold pressure corresponds to a target exhaust manifold pressure. A control amount pertaining to the exhaust manifold pressure control is the exhaust manifold pressure and an operation amount pertaining thereto is the opening degree of the variable nozzle 18. The control algorithm of the exhaust manifold pressure control consists of an FF control and an FB control.

In the FF control of the exhaust manifold pressure control, an FF term of the variable nozzle opening degree is calculated based on the engine rotation speed, the fuel injection quantity, and the opening degree of the EGR valve 32. The calculation of the FF term is performed by the use of a map which is drawn up based on data obtained by adaptation.

The FB control of the exhaust manifold pressure control is a PID control, in which the FB term of the opening degree of the variable nozzle 18 is calculated based on the deviation between the target exhaust manifold pressure and the current exhaust manifold pressure that is measured by the pressure sensor 68. The sum of the FF term and the FB term is set as the command value for the variable nozzle 18.

The throttle upstream pressure control is control for operating the variable nozzle 18 so that the throttle upstream pressure corresponds to a target throttle upstream pressure. A control amount pertaining to the throttle upstream pressure control is the throttle upstream pressure and an operation amount pertaining thereto is the opening degree of the variable nozzle 18. The control algorithm of the throttle upstream pressure control consists of an FF control and an FB control.

In the FF control of the throttle upstream pressure control, the FF term of the variable nozzle opening degree is calculated based on the engine rotation speed, the fuel injection quantity, and the opening degree of the EGR valve 32. The calculation of the FF term is performed by the use of a map which is drawn up based on data obtained by adaptation.

The FB control of the throttle upstream pressure control is a PID control, in which the FB term of the opening degree of the variable nozzle 18 is calculated based on the deviation between the target throttle upstream pressure and the current throttle upstream pressure that is measured by the pressure sensor 56. The sum of the FF term and the FB term is set as the command value for the variable nozzle 18.

The turbo efficiency control is control for operating the variable nozzle 18 such that turbo efficiency (turbocharging efficiency) corresponds to a target turbo efficiency. A control amount pertaining to the turbo efficiency control is the turbo efficiency and an operation amount pertaining thereto is the opening degree of the variable nozzle 18. The turbo efficiency can be defined as the ratio of work for adiabatic compression insertion to supply work toward the compressor. Specifically, the turbo efficiency can be represented by the following equation when the compressor has an inlet temperature of To, an outlet temperature of Ts, an inlet pressure of Po, an outlet pressure of Ps, and a specific heat ratio of K.

Turbo efficiency=$\{(Ps/Po)^{(K-1)/K}-1\}/(Ts/To-1)$

The control algorithm of the turbo efficiency control consists of an FF control and an FB control. In the FF control of the turbo efficiency control, the FF term of the variable nozzle opening degree is calculated based on the engine rotation speed, the fuel injection quantity, and the opening degree of the EGR valve 32. The calculation of the FF term is performed by the use of a map which is drawn up based on data obtained by adaptation.

The FB control of the turbo efficiency control is a PID control, in which the FB term of the opening degree of the variable nozzle 18 is calculated based on the deviation between the target turbo efficiency and the current turbo efficiency. The current turbo efficiency is calculated from the anterior/posterior pressures of the compressor 14 that are measured by the pressure sensors 62, 64 and the fresh air amount that is measured by the air flow meter 58. The sum of the FF term and the FB term is set as the command value for the variable nozzle 18.

Figure 4:
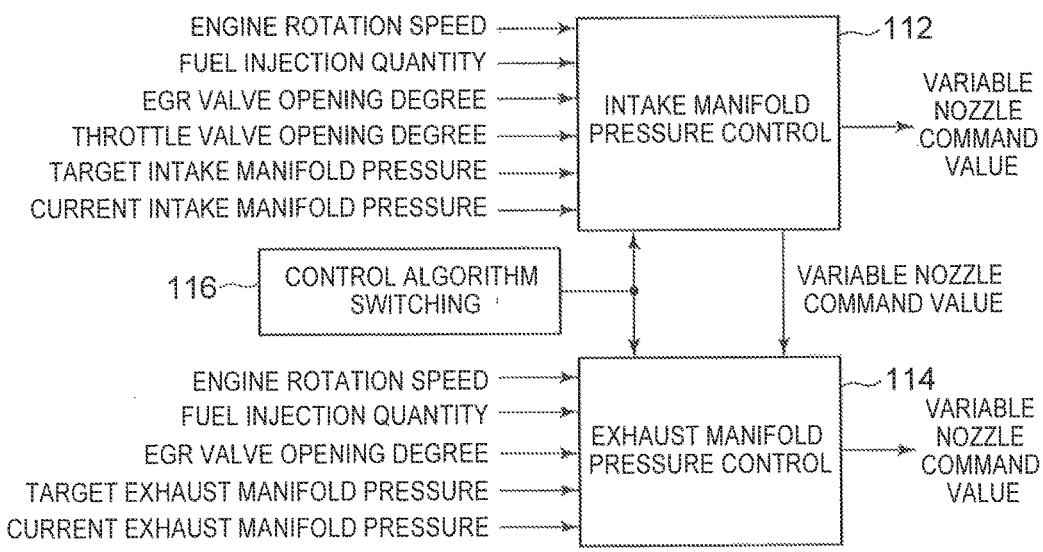
FIG. 4 is a drawing illustrating a control structure regarding a variable nozzle operation of the control device according to the embodiment of the invention.

Structural Drawing 4 is a block diagram illustrating one of the control structures of the control device 100 associated with the operation of the variable nozzle 18 and this control structure is associated with the intake manifold pressure control and the exhaust manifold pressure control in particular. The control structure that is illustrated in FIG. 4 includes an intake manifold pressure control unit 112 as the first calculating means, an exhaust manifold pressure control unit 114 as the second calculating means, and a control algorithm switching unit 116 as the control algorithm switching means. The intake manifold pressure control unit 112 calculates the command value for the variable nozzle 18 in accordance with the control algorithm of the intake manifold pressure control described above. The exhaust manifold pressure control unit 114 calculates the command value for the variable nozzle 18 in accordance with the control algorithm of the exhaust manifold pressure control described above.

The control algorithm switching unit 116 selects the control algorithm applied to the variable nozzle 18 and instructs the intake manifold pressure control unit 112 and the exhaust manifold pressure control unit 114 in accordance with a result of the selection. The intake manifold pressure control unit 112 and the exhaust manifold pressure control unit 114 stop or initiate command value calculation as instructed by the control algorithm switching unit 116. In a case where the exhaust manifold pressure control unit 114 initiates the command value calculation, the intake manifold pressure control unit 112 stops the command value calculation and passes the latest command value (previous value of the command value) to the exhaust manifold pressure control unit 114. In a case where the intake manifold pressure control unit 112 initiates the command value calculation, the exhaust manifold pressure control unit 114 stops the command value calculation and passes the latest command value (previous value of the command value) to the intake manifold pressure control unit 112. The calculation of the command value during the switching of the control algorithms will be described in detail later with reference to a flowchart.

These units 112, 114, 116 of the control device 100 are correlated with a variable nozzle operation routine stored in the ROM of the control device 100. When this routine is read from the ROM and executed by the CPU, functions of these units 112, 114, 116 are realized in the control device 100.

The switching of the control algorithms is performed not only between the intake manifold pressure control and the exhaust manifold pressure control but also in every combination including the throttle upstream pressure control and the turbo efficiency control as well. Each of the four control algorithms consists of an FF control and an FB control, and each of the FB controls is included in the I control. Accordingly, a control structure similar to the control structure that is illustrated in FIG. 4 can be used in every combination of the four control algorithms. In a case where the control algorithms are switched between the throttle upstream pressure control and the turbo efficiency control, for example, the throttle upstream pressure control may be applied to the unit 112 instead of the intake manifold pressure control and the turbo efficiency control may be applied to the unit 114 instead of the exhaust manifold pressure control in the control structure that is illustrated in FIG. 4.

Figure 5:
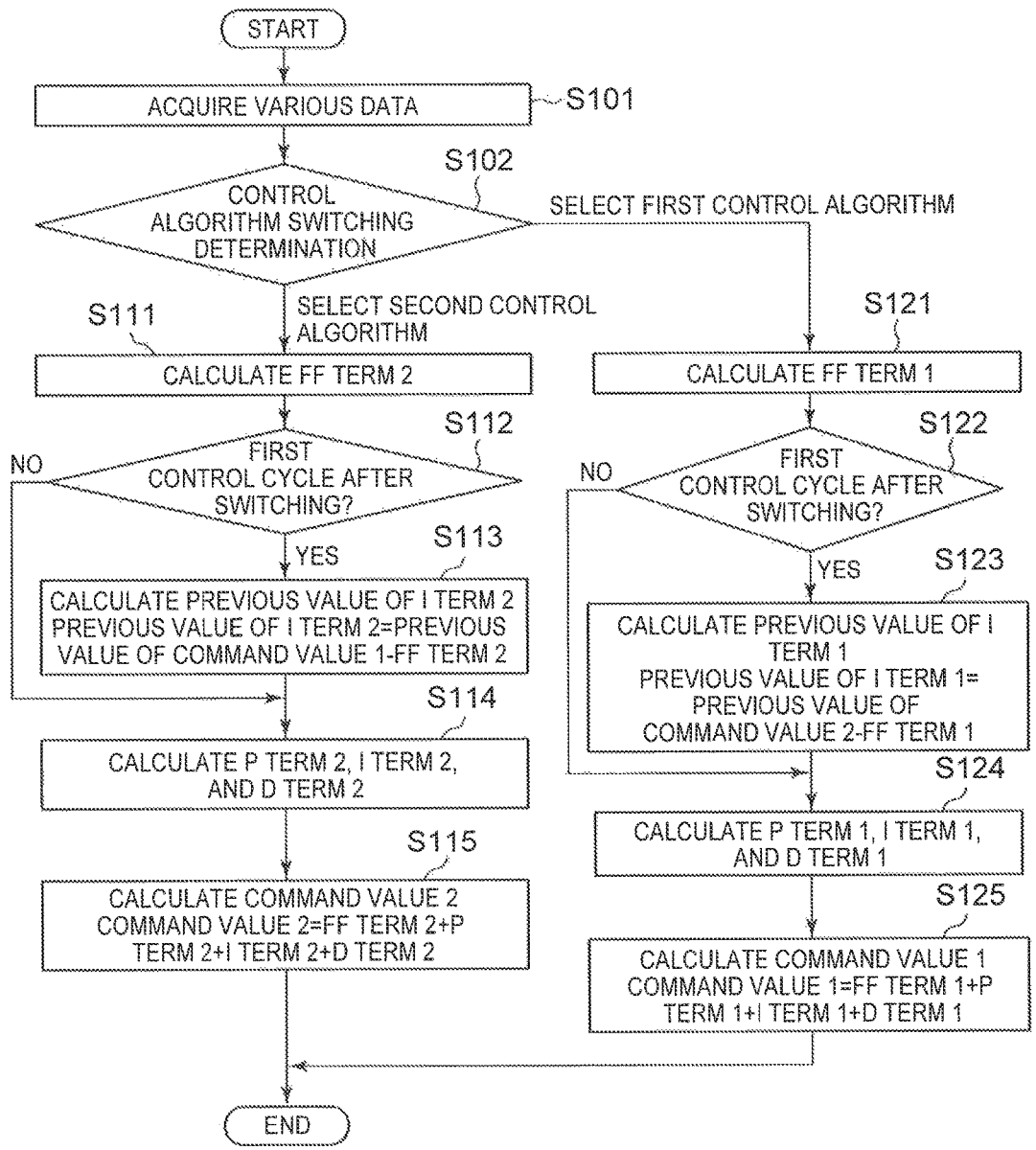
FIG. 5 is a flowchart illustrating a routine of the variable nozzle operation.

FIG. 5 is a flowchart illustrating a routine for realizing the functions of the units 112, 114, 116 associated with the operation of the variable nozzle 18 in the control device 100. The control device 100 executes the routine illustrated in FIG. 5 at a constant control cycle. The actuator in the following description refers to the variable nozzle 18. In addition, the first control algorithm in the following description refers to any one of the intake manifold pressure control, the exhaust manifold pressure control, the throttle upstream pressure control, and the turbo efficiency control and the second control algorithm in the following description refers to any one of the four control algorithms that is not the first control algorithm.

In FIG. 5, the same step numbers as in FIG. 2 are used to refer to the processing identical in content to those of the routine illustrated in FIG. 2. The routine that is illustrated in FIG. 5 and the routine that is illustrated in FIG. 2 are identical to each other when it comes to the processing pertaining to a case where the second control algorithm is selected in Step S102. The routine that is illustrated in FIG. 5 and the routine that is illustrated in FIG. 2 differ from each other when it comes to the processing pertaining to a case where the first control algorithm is selected in Step S102.

According to the flow that is illustrated in FIG. 5, Steps S121, S122, S123, S124, and S125 are executed as the subsequent processing or Steps S121, S122, S124, and S125 are executed as the subsequent processing in a case where the first control algorithm is selected in Step S102.

In Step S121, an FF term for the FF control (FF term 1) included in the first control algorithm is calculated.

In Step S121, it is checked whether or not the present control cycle is the first control cycle after the switching of the control algorithms. Step S123 is executed first and then Step S124 is executed when the present control cycle is the first control cycle after the switching to the first control algorithm. Otherwise, Step S124 is executed with Step S123 skipped.

In Step S123, the previous value of an I term for I control (I term 1) included in the first control algorithm is calculated. The previous value needs to be checked for the calculation of the I term since the intake manifold pressure control, the exhaust manifold pressure control, the throttle upstream pressure control, and the turbo efficiency control include the I control without exception. In Step S123, the value that is obtained by subtracting the FF term (FF term 1) which is calculated in Step S121 of the present control cycle from the command value which is calculated in Step S114 of the previous control cycle (previous value of command value 2) is calculated as in the following equation, and the value is set as the previous value of the I term (I term 1). In other words, the previous value of I term 1 is calculated based on the following equation.

Previous value of $I$ term 1=previous value of command value 2−FF term 1

In Step S124, a P term for P control (P term 1), the I term for I control (I term 1), and a D term for D control (D term 1) included in the first control algorithm are calculated based on the following respective equations. The "previous value of I term 1" in the following equation is the previous value of the I term calculated in Step S123 in a case where Step S123 is executed and is the I term calculated in Step S124 of the previous control cycle in a case where Step S123 is skipped. Herein, P term 1, I term 1, and D term 1 are calculated based on the following equations.

$P$ term 1=deviation×$P$ gain $I$ term 1=deviation×$I$ gain+previous value of $I$ term 1

$D$ term 1=differential value of deviation×$D$ gain

In Step S125, the command value that is given to the actuator (command value 1) is calculated by the use of the FF term calculated in Step S121 (FF term 1) and the FB terms calculated in Step S124 (P term 1, I term 1, and D term 1) and the following equation.

Command value 1=FF term 1+$P$ term 1+$I$ term 1+$D$ term 1

In a case where Step S123 is executed, that is, in the first control cycle after the switching from the second control algorithm to the first control algorithm, the command value that is given to the actuator (command value 1) is represented by the following equation in the end.

Command value 1=$P$ term 1+update amount of $I$ term 1+$D$ term 1+previous value of command value 2

As shown by the equation above, the amount of change in the command value (the amount of change in the current value with respect to the previous value) that occurs in the first control cycle after the switching from the second control algorithm to the first control algorithm becomes only the amount of change represented by the sum of P term 1, the update amount of I term 1, and D term 1, that is, the amount of change in accordance with the deviation. In addition, according to the routine illustrated in FIG. 5, the amount of change in the command value (the amount of change in the current value with respect to the previous value) that occurs in the first control cycle after the switching from the first control algorithm to the second control algorithm becomes only the amount of change in accordance with the deviation as well. In other words, when both of the two control algorithms that are subjected to the switching include the FF control and the I control, the calculation of the command value in accordance with the routine illustrated in FIG. 5 ensures controllability by the FB control and allows a continuous command value with no sudden change to be obtained in the bi-directional switching.

An operation of the EGR valve 32 is performed under the EGR valve anterior/posterior differential pressure control and EGR rate control described below.

The EGR valve anterior/posterior differential pressure control is control for operating the EGR valve 32 such that the differential pressure between upstream pressure and downstream pressure of the EGR valve 32 (referred to as an EGR valve anterior/posterior differential pressure) corresponds to a target differential pressure. A control amount pertaining to the EGR valve anterior/posterior differential pressure control is the EGR valve anterior/posterior differential pressure and an operation amount pertaining thereto is the opening degree of the EGR valve 32, more specifically, an opening degree with respect to a fully-closed position pertaining to a case where the fully-closed position is a basic position. The control algorithm of the EGR valve anterior/posterior differential pressure control consists of an FF control.

In the FF control of the EGR valve anterior/posterior differential pressure control, an FF term of the EGR valve opening degree is calculated based on the engine rotation speed and the fuel injection quantity. The calculation of the FF term is performed by the use of a map which is drawn up based on data obtained by adaptation. As described above, the operation of the EGR valve 32 based on the EGR valve anterior/posterior differential pressure control is carried out in combination with the operation of the throttle 24 based on the fresh air amount control.

The EGR rate control is control for operating the EGR valve 32 so that an EGR rate of gas suctioned into the cylinder corresponds to a target EGR rate. A control amount pertaining to the EGR rate control is the EGR rate and an operation amount pertaining thereto is the opening degree of the EGR valve 32. The control algorithm of the EGR rate control consists of an FB control.

The FB control of the EGR rate control is a PID control, in which an FB term of the EGR valve opening degree is calculated based on the deviation between the target EGR rate and the current EGR rate. The FB term is set as the command value for the EGR valve 32. As described above, the operation of the EGR valve 32 based on the EGR rate control is carried out in combination with the operation of the throttle 24 based on the throttle anterior/posterior differential pressure control.

The EGR rate is the ratio of an EGR gas amount per stroke to a total gas amount per stroke, and the EGR gas amount per stroke is the difference between the total gas amount per stroke and the fresh air amount per stroke. The total gas amount per stroke can be calculated from the engine rotation speed, the intake manifold pressure, and an intake manifold temperature. The fresh air amount per stroke can be calculated from the fresh air amount per hour that is measured by the air flow meter 58 and the engine rotation speed. The current EGR rate can be calculated from the fresh air amount that is measured by the air flow meter 58, the intake manifold pressure, the intake manifold temperature, and the engine rotation speed. The target EGR rate is an EGR rate for obtaining the target fresh air amount, and the target fresh air amount is determined from the engine rotation speed and the fuel injection quantity. Accordingly, the target EGR rate can be calculated from the engine rotation speed, the fuel injection quantity, the intake manifold pressure, and the intake manifold temperature. The current EGR rate and target EGR rate calculation methods described above are merely examples, and the current EGR rate and the target EGR rate may be calculated from a larger number of parameters or may be calculated in a simplified manner from a smaller number of parameters.

The control structure that is illustrated in FIG. 2 can be applied to the control structure for the EGR valve operation. The EGR rate control includes the FB control as is the case with the fresh air amount control and the EGR valve anterior/posterior differential pressure control includes no FB control as is the case with the throttle anterior/posterior differential pressure control, and thus the EGR rate control may be applied to the unit 104 instead of the fresh air amount control and the EGR valve anterior/posterior differential pressure control may be applied to the unit 102 instead of the throttle anterior/posterior differential pressure control in the control structure that is illustrated in FIG. 2.

The routine that is illustrated in FIG. 3 can be applied to an EGR valve operation routine. In this case, the actuator refers to the EGR valve 32, the first control algorithm refers to the control algorithm of the EGR valve anterior/posterior differential pressure control, and the second control algorithm refers to the control algorithm of the EGR rate control. However, FF term 2 is regarded as zero in Steps S111, S113, and S115 since the EGR rate control includes no FF control.

An operation of the bypass valve 38 is performed under the EGR valve anterior temperature control and the EGR cooler efficiency control described below.

The EGR valve anterior temperature control is control for operating the bypass valve 38 such that an inlet temperature of the EGR valve 32 corresponds to a target temperature. A control amount pertaining to the EGR valve anterior temperature control is the inlet temperature of the EGR valve 32 and an operation amount pertaining thereto is the position of the bypass valve 38, more specifically, a position that has, as references, a fully-open position at which the EGR gas flows to the EGR cooler 34 in entirety and a fully-closed position at which the EGR gas flows to the bypass passage 36 in entirety. The control algorithm of the EGR valve anterior temperature control consists of an FF control.

In the FF control of the EGR valve anterior temperature control, an FF term of the bypass valve position is calculated based on the engine rotation speed and the fuel injection quantity. The calculation of the FF term is performed by the use of a map which is drawn up based on data obtained by adaptation.

The EGR cooler efficiency control is control for operating the bypass valve 38 so that the efficiency of cooling of the EGR gas by the EGR cooler 34 corresponds to a target efficiency. A control amount pertaining to the EGR cooler efficiency control is the EGR gas cooling efficiency and an operation amount pertaining thereto is the position of the bypass valve 38. The control algorithm of the EGR cooler efficiency control consists of an FF control and an FB control.

In the FF control of the EGR cooler efficiency control, the FF term of the bypass valve position is calculated based on the target efficiency, the EGR gas amount, an EGR cooler inlet temperature, and a water temperature. The calculation of the FF term is performed by the use of a map which is drawn up based on data obtained by adaptation.

The FB control of the EGR cooler efficiency control is a PID control, in which the FB term of the bypass valve position is calculated based on the deviation between the target efficiency and the current efficiency. The target efficiency is determined from a map based on the fuel injection quantity and the engine rotation speed. The current efficiency is calculated based on the EGR gas amount, an EGR cooler inflow water temperature, the EGR cooler inlet temperature, an EGR cooler outlet temperature, and the like.

The EGR gas amount can be calculated from the opening degree of the EGR valve 32 and the anterior/posterior differential pressure of the EGR valve 32. Each of the temperature of cooling water that flows into the EGR cooler 34 and the temperatures of the exhaust gas at the inlet and outlet of the EGR cooler 34 can be measured by a temperature sensor (not illustrated). The sum of the FF term and the FB term is set as the command value for the bypass valve 38.

The control structure that is illustrated in FIG. 2 can be applied to the control structure for the bypass valve operation. The EGR cooler efficiency control includes the FB control as is the case with the fresh air amount control and the EGR valve anterior temperature control includes no FB control as is the case with the throttle anterior/posterior differential pressure control, and thus the EGR cooler efficiency control may be applied to the unit 104 instead of the fresh air amount control and the EGR valve anterior temperature control may be applied to the unit 102 instead of the throttle anterior/posterior differential pressure control in the control structure that is illustrated in FIG. 2.

The routine that is illustrated in FIG. 3 can be applied to a bypass valve operation routine. In this case, the actuator refers to the bypass valve 38, the first control algorithm refers to the control algorithm of the EGR valve anterior temperature control, and the second control algorithm refers to the control algorithm of the EGR cooler efficiency control.

An operation of the urea addition valve 76 is performed under the equivalence ratio control and the ammonia adsorption amount control described below.

The equivalence ratio control is control for operating the urea addition valve 76 such that an equivalence ratio of ammonia to the NOx in the exhaust gas flowing into the SCR 74 corresponds to a target equivalence ratio. A control amount pertaining to the equivalence ratio control is the equivalence ratio and an operation amount pertaining thereto is a urea addition amount of the urea addition valve 76. The control algorithm of the equivalence ratio control consists of an FF control.

In the FF control of the equivalence ratio control, an FF term of the urea addition amount is calculated based on the target equivalence ratio and the flow rate of the NOx flowing into the SCR 74. The NOx flow rate is estimated based on the operating states of the engine 2 such as the engine rotation speed and the fuel injection quantity. The calculation of the FF term is performed by the use of a map which is drawn up based on data obtained by adaptation.

The ammonia adsorption amount control is control for operating the urea addition valve 76 such that the amount of ammonia adsorbed onto the SCR 74 corresponds to a target adsorption amount. A control amount pertaining to the ammonia adsorption amount control is the ammonia adsorption amount of the SCR 74 and an operation amount pertaining thereto is the urea addition amount of the urea addition valve 76. The control algorithm of the ammonia adsorption amount control consists of an FF control and an FB control.

In the FF control of the ammonia adsorption amount control, the FF term of the urea addition amount is calculated based on the temperature of the SCR 74 and the flow rate of the NOx flowing into the SCR 74. The temperature of the SCR 74 may be estimated based on the operating state of the engine 2 or may be measured by a temperature sensor (not illustrated). The calculation of the FF term is performed by the use of a map which is drawn up based on data obtained by adaptation.

The FB control of the ammonia adsorption amount control is a PID control, in which the FB term of the urea addition amount is calculated based on the deviation between the target adsorption amount and the current adsorption amount. The target adsorption amount is determined from a map based on the fuel injection quantity and the engine rotation speed. The current adsorption amount is estimated from the concentration of the NOx in the exhaust gas passing through the SCR 74 which is measured by the NOx sensor 78. The sum of the FF term and the FB term is set as the command value for the urea addition valve 76.

The control structure that is illustrated in FIG. 2 can be applied to the control structure for the urea addition valve operation. The ammonia adsorption amount control includes the FB control as is the case with the fresh air amount control and the equivalence ratio control includes no FB control as is the case with the throttle anterior/posterior differential pressure control, and thus the ammonia adsorption amount control may be applied to the unit 104 instead of the fresh air amount control and the equivalence ratio control may be applied to the unit 102 instead of the throttle anterior/posterior differential pressure control in the control structure that is illustrated in FIG. 2.

The routine that is illustrated in FIG. 3 can be applied to a urea addition valve operation routine. In this case, the actuator refers to the urea addition valve 76, the first control algorithm refers to the control algorithm of the equivalence ratio control, and the second control algorithm refers to the control algorithm of the ammonia adsorption amount control.

FIGS. 6 to 15 are presented as specific embodiments of the invention.

In Example 1, the invention is applied to the calculation of the command value pertaining to a case where the control algorithm associated with the variable nozzle operation is switched from the intake manifold pressure control to the exhaust manifold pressure control. The behaviors of the exhaust manifold pressure and the intake manifold pressure that are illustrated in Example 1 and comparative examples thereof are not those measured in the actual engine but those calculated by the use of a simulation model that is modeled after the engine.

Figure 6:
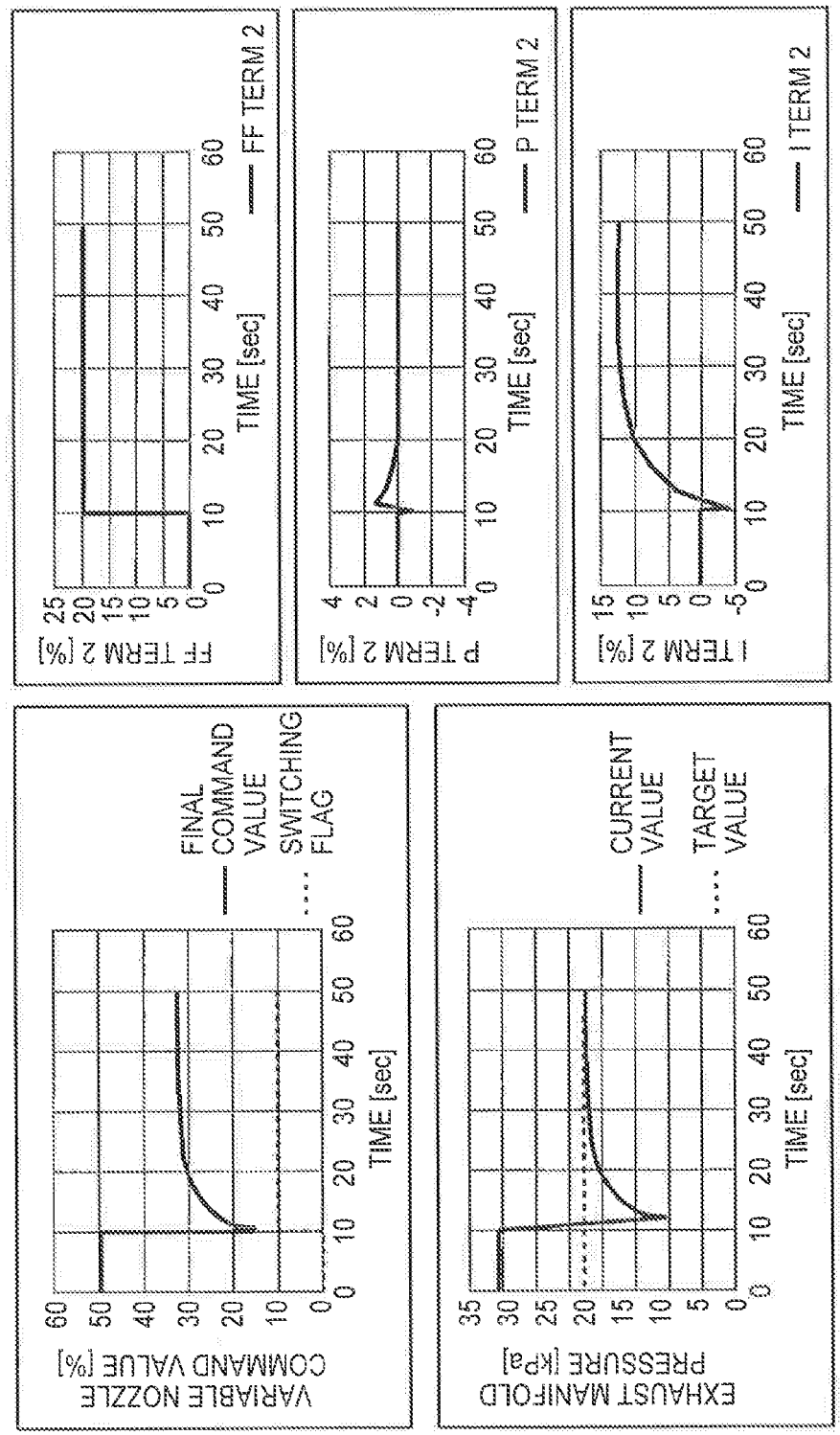
FIG. 6 is a graph group illustrating a calculation result according to a first comparative example with respect to Example 1.
Figure 7:
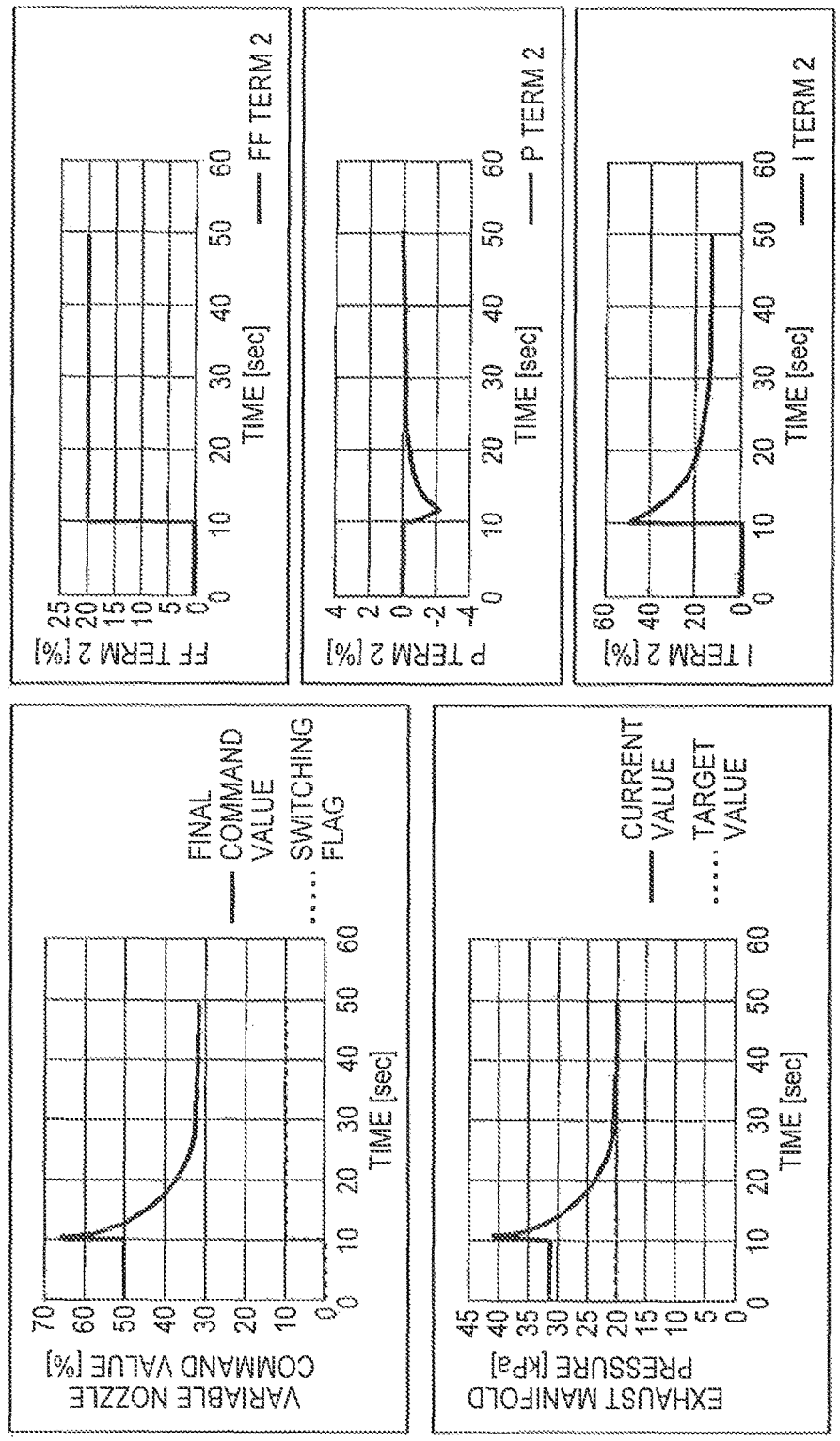
FIG. 7 is a graph group illustrating a calculation result according to a second comparative example with respect to Example 1.
Figure 8:
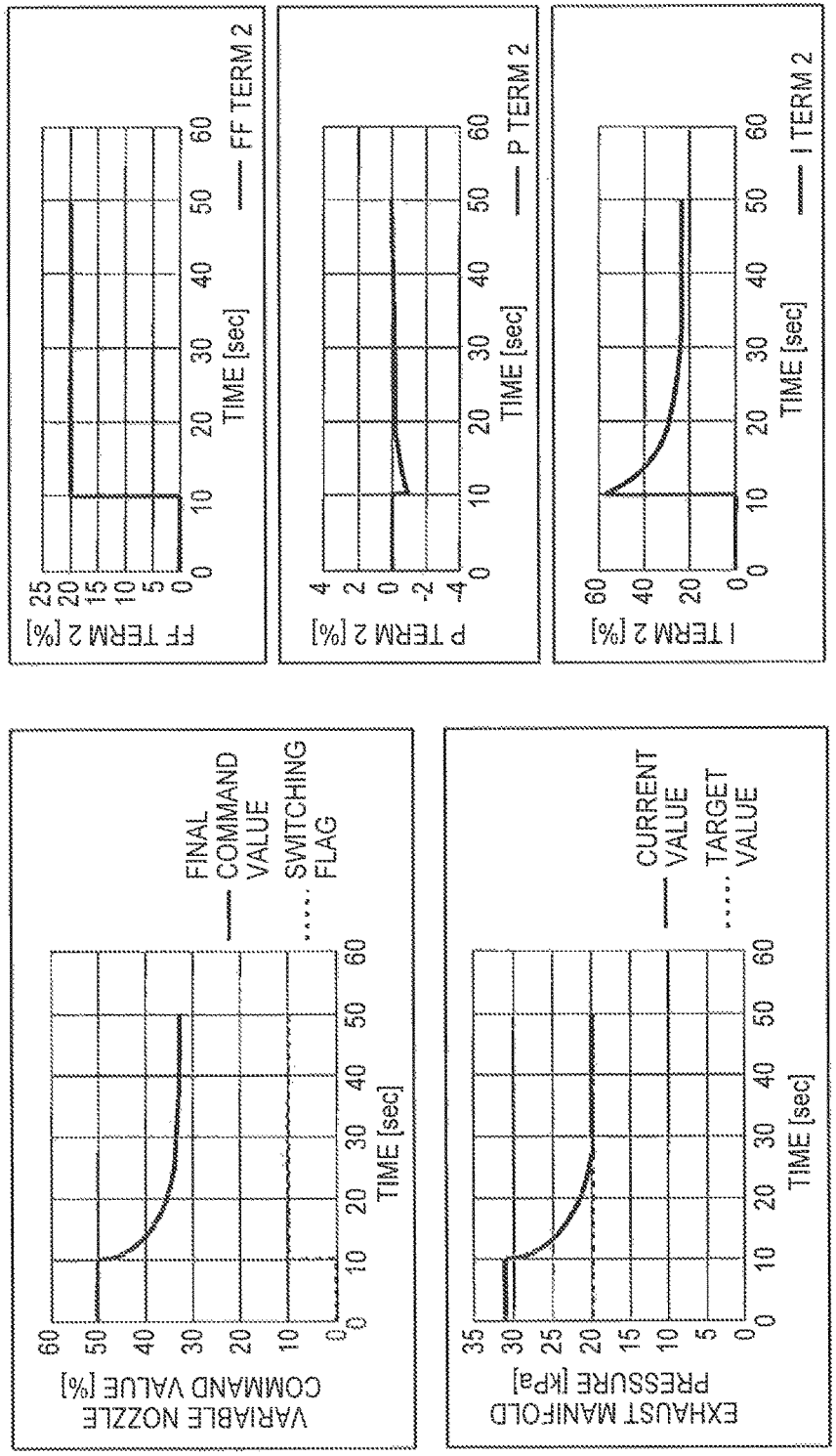
FIG. 8 is a graph group illustrating a calculation result according to Example 1.

FIG. 6 is a graph group illustrating a calculation result according to a first comparative example (Comparative Example 1A) with respect to Example 1. FIG. 7 is a graph group illustrating a calculation result according to a second comparative example (Comparative Example 1B) with respect to Example 1. FIG. 8 is a graph group illustrating a calculation result according to Example 1. FIGS. 6 to 8 show graphs of the behavior of the variable nozzle command value, graphs of the behavior of the exhaust manifold pressure, graphs of the behavior of FF term 2, graphs of the behavior of P term 2, and graphs of the behavior of I term 2. In Example 1 and the comparative examples thereof, each gain of the FB control of the intake manifold pressure control and the exhaust manifold pressure control is set as follows. Because of this setting, the FF control is performed in the intake manifold pressure control and the FF control and PI control are performed in the exhaust manifold pressure control in Example 1 and the comparative examples thereof.

Intake manifold pressure control: $P$ gain=0, $I$ gain=0, $D$ gain=0

Exhaust manifold pressure control: $P$ gain=0.1, $I$ gain=0.3, $D$ gain=0

In Comparative Example 1A that is illustrated in FIG. 6, zero is set as the previous value of I term 2 in the first control cycle after the switching.

According to Comparative Example 1A, the variable nozzle command value immediately before the switching of the control algorithms is 50% and FF term 2 immediately after the switching is 20%. 0% is set as the previous value of I term 2 immediately after the switching, and thus the value that is obtained by adding the update amount to 0% becomes I term 2 immediately after the switching. The exhaust manifold pressure immediately after the switching is higher than a target value, and thus the update amount proportional to the deviation between the target value and the current value is a negative value and I term 2 is a value that is slightly lower than 0%.

As a result of the above-described calculation of the value of I term 2 immediately after the switching, the variable nozzle command value is subjected to a sudden change in a closing direction immediately after the switching. As a result, a sudden change occurs in the exhaust manifold pressure, which is a control amount, and the exhaust manifold pressure falls far below the target value.

In Comparative Example 1B that is illustrated in FIG. 7, the previous value of the FF term is set as the previous value of I term 2 in the first control cycle after the switching.

According to Comparative Example 1B, the variable nozzle command value immediately before the switching of the control algorithms is 50% and FF term 2 immediately after the switching is 20%. The previous value of the FF term is 50%, which is equal to the variable nozzle command value immediately before the switching, and thus the previous value of I term 2 immediately after the switching is set to 50% as well. Accordingly, the value that is obtained by adding the update amount to 50% becomes I term 2 immediately after the switching. The exhaust manifold pressure immediately after the switching is higher than the target value, and thus the update amount proportional to the deviation between the target value and the current value is a negative value and I term 2 is a value that is slightly lower than 50%.

As a result of the above-described calculation of the value of I term 2 immediately after the switching, the variable nozzle command value is subjected to a sudden change in an opening direction immediately after the switching. As a result, a sudden change occurs in the exhaust manifold pressure, which is a control amount, and the exhaust manifold pressure temporarily changes away from the target value.

In Example 1 illustrated in FIG. 8, the value that is obtained by subtracting the current value of FF term 2 from the previous value of the command value is the previous value of I term 2 in the first control cycle after the switching because of the processing of Step S113 of the routine illustrated in FIG. 2.

According to Example 1, the variable nozzle command value immediately before the switching of the control algorithms is 50% and FF term 2 immediately after the switching is 20%. As a result, the previous value of I term 2 immediately after the switching is set to 30%, and the value that is obtained by adding the update amount to 30% becomes I term 2 immediately after the switching. The exhaust manifold pressure immediately after the switching is higher than the target value, and thus the update amount proportional to the deviation between the target value and the current value is a negative value and I term 2 is a value that is slightly lower than 30%.

As a result of the above-described calculation of the value of I term 2 immediately after the switching, the variable nozzle command value immediately after the switching goes through no sudden change and the variable nozzle command value smoothly changes thereafter as well despite the update amounts of P term 2 and I term 2, which are deviation-dependent terms, being reliably reflected in the variable nozzle command value. As a result, the exhaust manifold pressure, which is a control amount, begins to smoothly change toward the target value immediately after the switching of the control algorithms.

In Example 2, the invention is applied to the calculation of the command value pertaining to a case where the control algorithm associated with the variable nozzle operation is switched from the intake manifold pressure control to the exhaust manifold pressure control. Example 2 differs from Example 1 in terms of the control algorithm of the intake manifold pressure control. The behaviors of the exhaust manifold pressure and the intake manifold pressure that are illustrated in Example 2 and comparative examples thereof are not those measured in the actual engine but those calculated by the use of a simulation model that is modeled after the engine.

Figure 9:
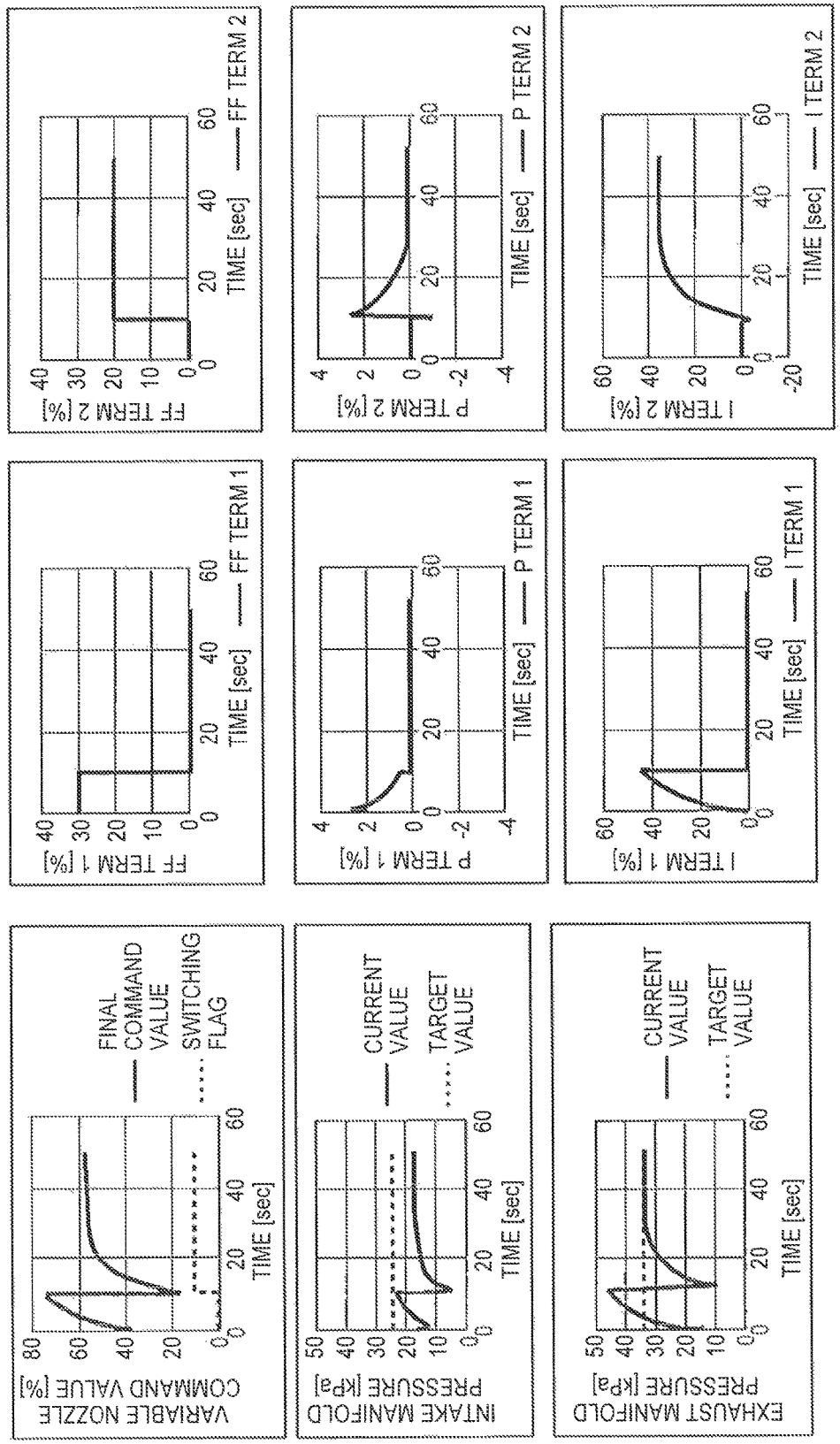
FIG. 9 is a graph group illustrating the calculation result according to the first comparative example with respect to Example 2.
Figure 10:
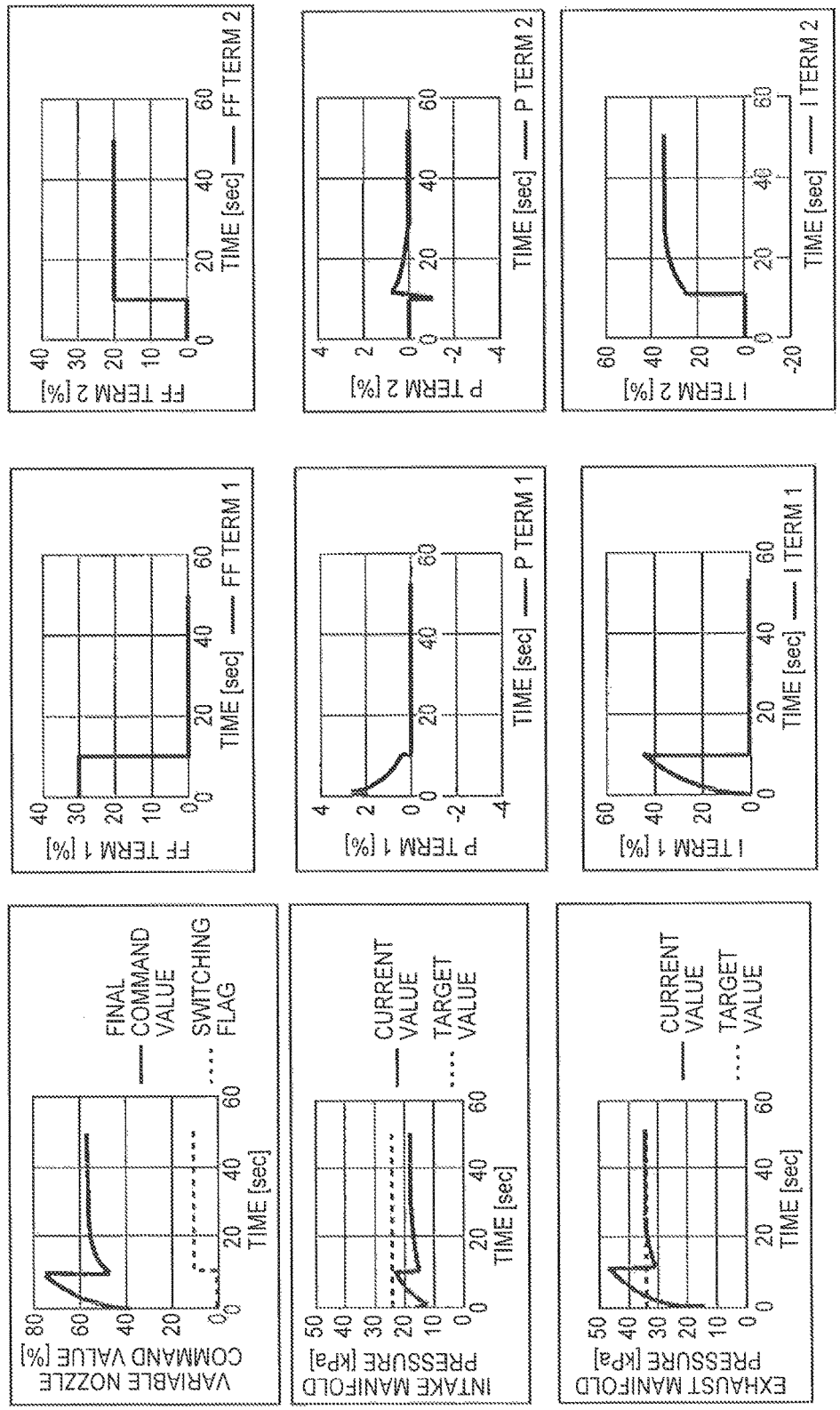
FIG. 10 is a graph group illustrating the calculation result according to the second comparative example with respect to Example 2.
Figure 11:
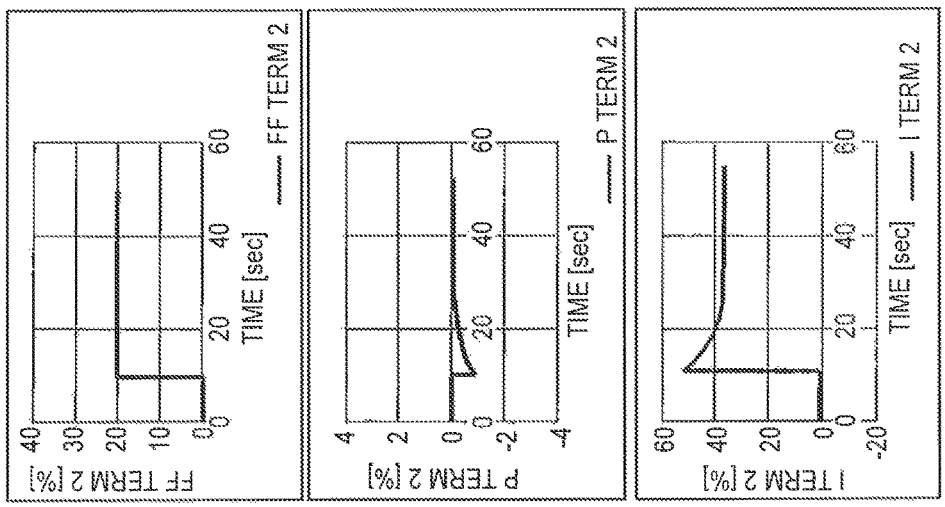
FIG. 11 is a graph group illustrating a calculation result according to Example 2.
Figure 11:
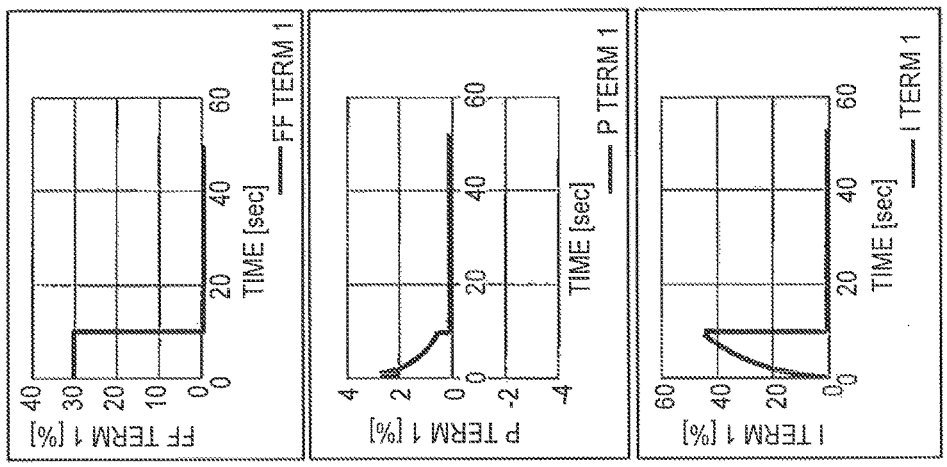
Figure 11:
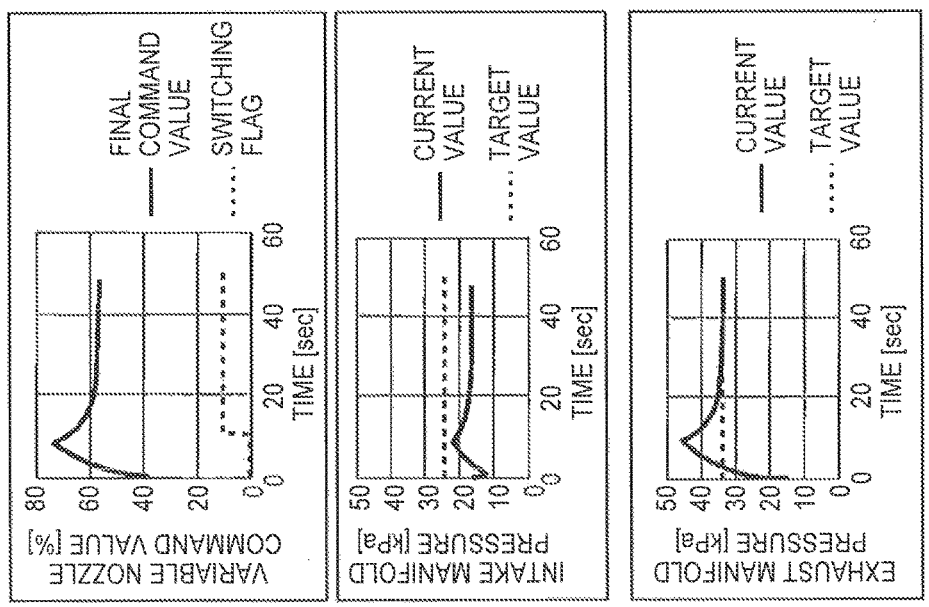

FIG. 9 is a graph group illustrating a calculation result according to a first comparative example (Comparative Example 2A) with respect to Example 2. FIG. 10 is a graph group illustrating a calculation result according to a second comparative example (Comparative Example 2B) with respect to Example 2. FIG. 11 is a graph group illustrating a calculation result according to Example 2. Each of FIGS. 9 to 11 shows a graph of the behavior of the variable nozzle command value, a graph of the behavior of the intake manifold pressure, a graph of the behavior of the exhaust manifold pressure, a graph of the behavior of FF term 1, a graph of the behavior of P term 1, a graph of the behavior of I term 1, a graph of the behavior of FF term 2, a graph of the behavior of P term 2, and a graph of the behavior of I term 2. In Example 2 and the comparative examples thereof, each gain of the FB control of the intake manifold pressure control and the exhaust manifold pressure control is set as follows. Because of this setting, the FF control and PI control are performed in the intake manifold pressure control and the exhaust manifold pressure control alike in Example 2 and the comparative examples thereof.

Intake manifold pressure control: $P$ gain=0.2, $I$ gain=0.6, $D$ gain=0

Exhaust manifold pressure control: $P$ gain=0.1, $I$ gain=0.3, $D$ gain=0

In Comparative Example 2A that is illustrated in FIG. 9, zero is set as the previous value of I term 2 in the first control cycle after the switching.

According to Comparative Example 2A, the variable nozzle command value immediately after the switching of the control algorithms suddenly changes in the closing direction and suddenly changes in the opening direction in addition thereto. As a result, the exhaust manifold pressure, which is a control amount, is rapidly reduced, falls far below the target value, and then rises rapidly to the target value.

In Comparative Example 2B that is illustrated in FIG. 10, the previous value of the FF term is set as the previous value of I term 2 in the first control cycle after the switching.

According to Comparative Example 2B, the variable nozzle command value suddenly changes in the closing direction immediately after the switching of the control algorithms although the degree of the sudden change is less than that according to Comparative Example 2A. As a result, the exhaust manifold pressure, which is a control amount, is rapidly reduced, falls far below the target value, and then rises rapidly to the target value although the degree of the reduction is less than that according to Comparative Example 2A.

In Example 2 illustrated in FIG. 11, the value that is obtained by subtracting the current value of the FF term from the previous value of the command value is the previous value of I term 2 in the first control cycle after the switching because of the processing of Step S113 of the routine illustrated in FIG. 2.

According to Example 2, the variable nozzle command value goes through no sudden change immediately after the switching and the variable nozzle command value smoothly changes thereafter as well. As a result, the exhaust manifold pressure, which is a control amount, begins to smoothly change toward the target value immediately after the switching of the control algorithms.

As is apparent from the comparison between the calculation results according to the two embodiments described above and the calculation results according to the comparative examples with respect to these embodiments, a sudden change in the command value given to the actuator that is attributable to the switching of the control algorithms can be suppressed and the control amount can be smoothly changed toward the target value according to the invention.

In Example 3, the invention is applied to the calculation of the command value pertaining to a case where the control algorithm associated with the throttle operation is switched from the fresh air amount control to the throttle anterior/posterior differential pressure control (hereinafter, simply referred to as a "differential pressure control"). Basically, the control algorithm of the differential pressure control consists of an FF control as described in "2-1. Throttle Operation". However, the differential pressure control can also be configured to consist of an FF control and an FB control. In the FB control, an FB term of the throttle closing degree is calculated based on the deviation between the target differential pressure and the current differential pressure. In Example 3 and Example 4 (described later), the applicability of the invention regarding such a modification example will be described. The behaviors of the fresh air amount and the differential pressure that are illustrated in Example 3 are not those measured in the actual engine but those calculated by the use of a simulation model that is modeled after the engine.

Figure 12:
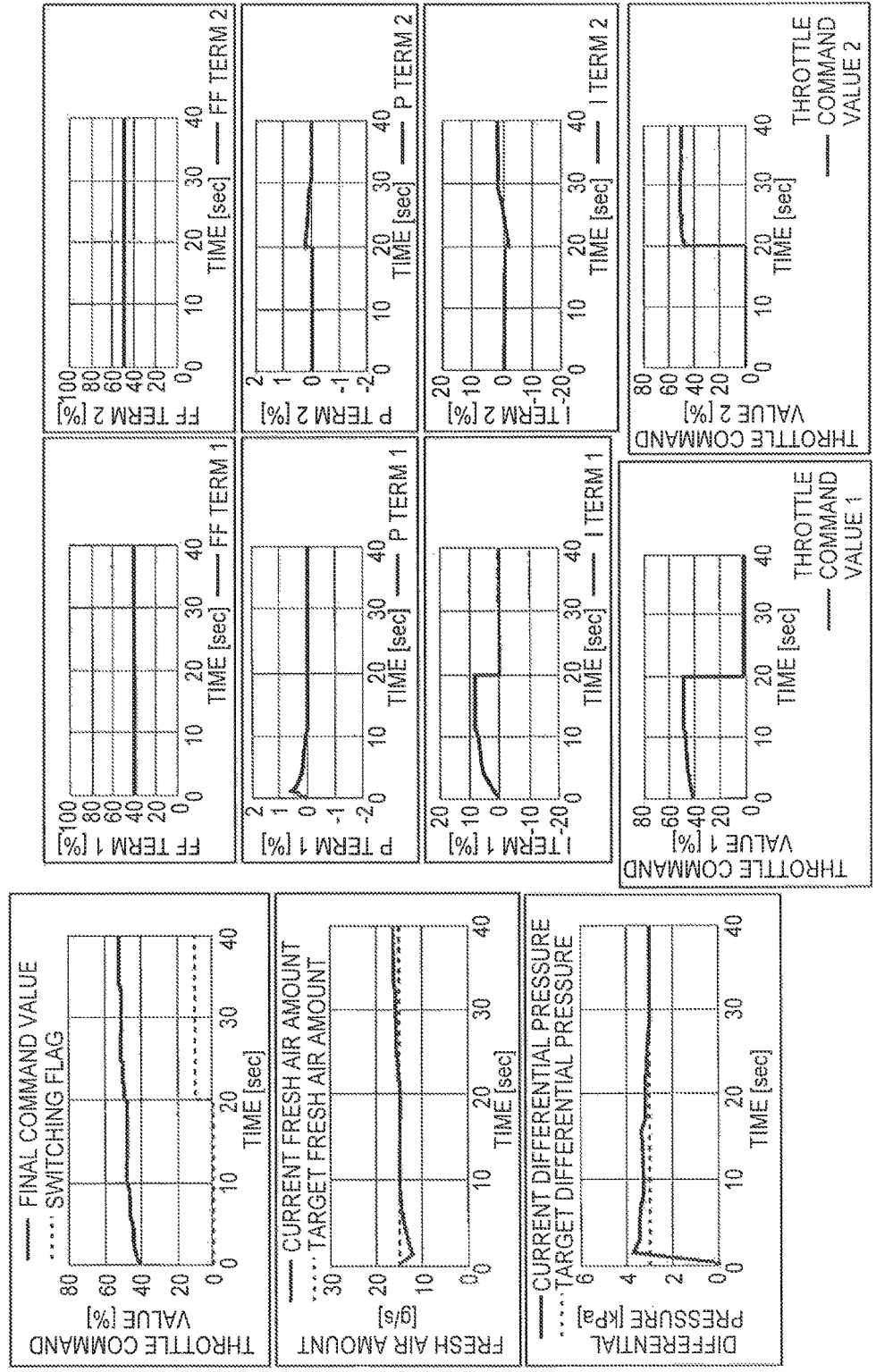
FIG. 12 is a graph group illustrating a calculation result according to Example 3.

FIG. 12 is a graph group illustrating a calculation result according to Example 3. FIG. 12 shows a graph of the behavior of the throttle command value, a graph of the behavior of the fresh air amount, a graph of the behavior of the differential pressure, a graph of the behavior of FF term 1, a graph of the behavior of P term 1, a graph of the behavior of I term 1, a graph of the behavior of throttle command value 1, a graph of the behavior of FF term 2, a graph of the behavior of P term 2, a graph of the behavior of I term 2, and a graph of the behavior of throttle command value 2. In Example 3, each gain of the FB control of the fresh air amount control and the differential pressure control is set as follows. Because of this setting, the FF control and PI control are performed in the fresh air amount control and the differential pressure control alike in Example 3.

Fresh air amount control: $P$ gain=0.2, $I$ gain=0.8, $D$ gain=0

Differential pressure control: $P$ gain=−1, $I$ gain=−3, $D$ gain=0

In Example 3, the value that is obtained by subtracting FF term 2 immediately after the switching from throttle command value 1 immediately before the switching of the control algorithms is the previous value of I term 2 in the first control cycle after the switching. Throttle command value 1 immediately before the switching is 50%, and FF term 2 is 50% immediately after the switching. As a result, 0% is set as the previous value of I term 2 immediately after the switching, and the value that is obtained by adding the update amount to 0% becomes I term 2 immediately after the switching.

The update amounts of P term 2 and I term 2, which are deviation-dependent terms, begin to be reflected in the throttle command value (throttle command value 1) immediately after the switching. Accordingly, no sudden change occurs in the throttle command value before and after the switching, as illustrated in the graph of the behavior of the throttle command value, although a change equivalent to the deviation-dependent term occurs before and after the switching. In Example 3, the fresh air amount can be controlled to correspond to the target value until the switching of the control algorithms and the differential pressure can be controlled to correspond to the target value after the switching as illustrated in the graph of the behavior of the fresh air amount and the graph of the behavior of the differential pressure.

In Example 4, the invention is applied to the calculation of the command value pertaining to a case where the control algorithm associated with the throttle operation is switched from the fresh air amount control to the differential pressure control. Example 4 differs from Example 3 in terms of the control algorithm of the differential pressure control. The behaviors of the fresh air amount and the differential pressure that are illustrated in Example 4 are not those measured in the actual engine but those calculated by the use of a simulation model that is modeled after the engine.

Figure 13:
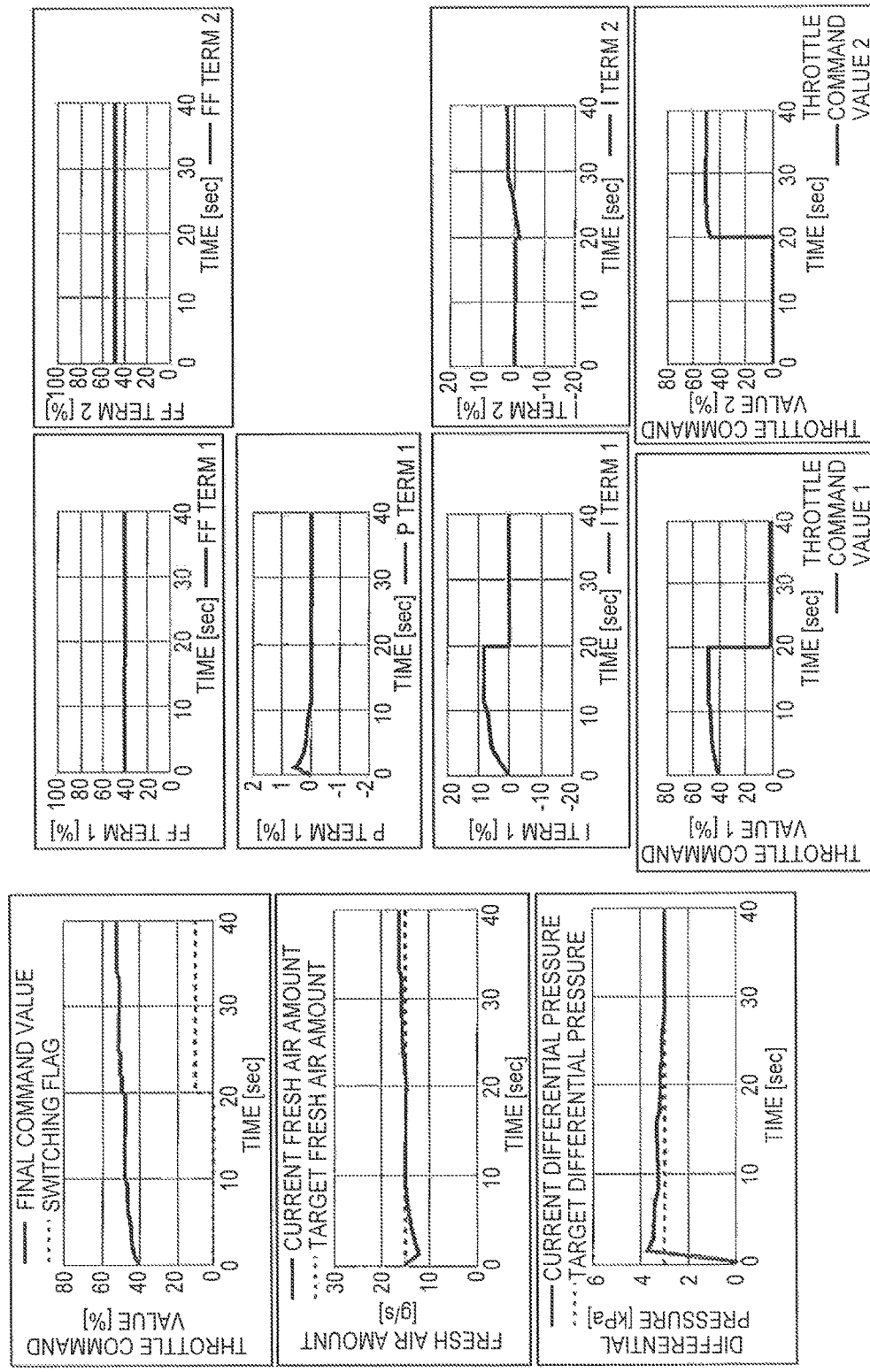
FIG. 13 is a graph group illustrating a calculation result according to Example 4.

FIG. 13 is a graph group illustrating a calculation result according to Example 4. FIG. 13 shows a graph of the behavior of the throttle command value, a graph of the behavior of the fresh air amount, a graph of the behavior of the differential pressure, a graph of the behavior of FF term 1, a graph of the behavior of P term 1, a graph of the behavior of I term 1, a graph of the behavior of throttle command value 1, a graph of the behavior of FF term 2, a graph of the behavior of I term 2, and a graph of the behavior of throttle command value 2. In Example 4, each gain of the FB control of the fresh air amount control and the differential pressure control is set as follows. Because of this setting, the FF control and PI control are performed in the fresh air amount control and the FF control and I control are performed in the differential pressure control in Example 4.

Fresh air amount control: $P$ gain=0.2, $I$ gain=0.8, $D$ gain=0

Differential pressure control: $P$ gain=0, $I$ gain=−3, $D$ gain=0

In Example 4, the value that is obtained by adding the update amount of I term 2 immediately after the switching to throttle command value 1 immediately before the switching of the control algorithms is throttle command value 2 immediately after the switching. Accordingly, no sudden change occurs in the throttle command value before and after the switching of the control algorithms, as illustrated in the graph of the behavior of the throttle command value, although a change equivalent to the update amount of I term 2 occurs. In addition, even in Example 4, the fresh air amount can be controlled to correspond to the target value until the switching of the control algorithms and the differential pressure can be controlled to correspond to the target value after the switching as illustrated in the graph of the behavior of the fresh air amount and the graph of the behavior of the differential pressure.

In Example 5, the invention is applied to the calculation of the command value pertaining to a case where the control algorithm associated with the throttle operation is switched from the fresh air amount control to the differential pressure control. A case where the differential pressure control is configured to consist of the FF control and the FB control has been described in Examples 3 and 4, but the differential pressure control can also be configured to consist only of an FB control. In Example 5 and Example 6 (described later), the applicability of the invention regarding such a modification example will be described. The behaviors of the fresh air amount and the differential pressure that are illustrated in Example 5 are not those measured in the actual engine but those calculated by the use of a simulation model that is modeled after the engine.

Figure 14:
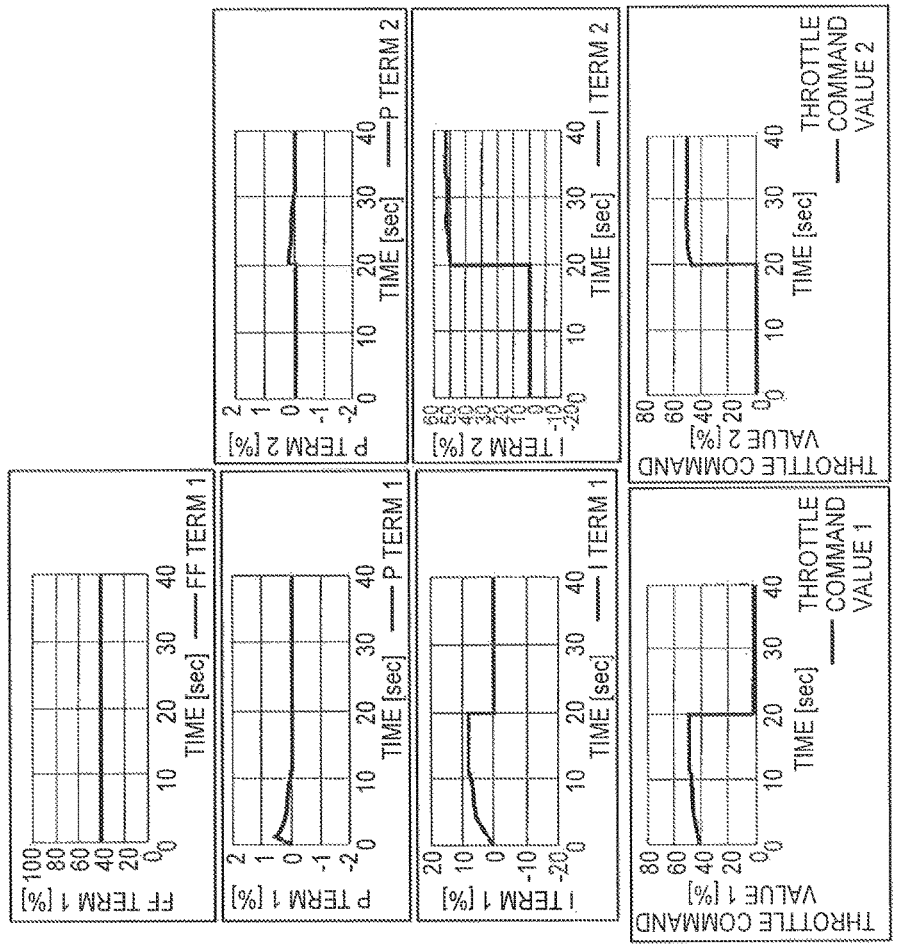
FIG. 14 is a graph group illustrating a calculation result according to Example 5.
Figure 14:
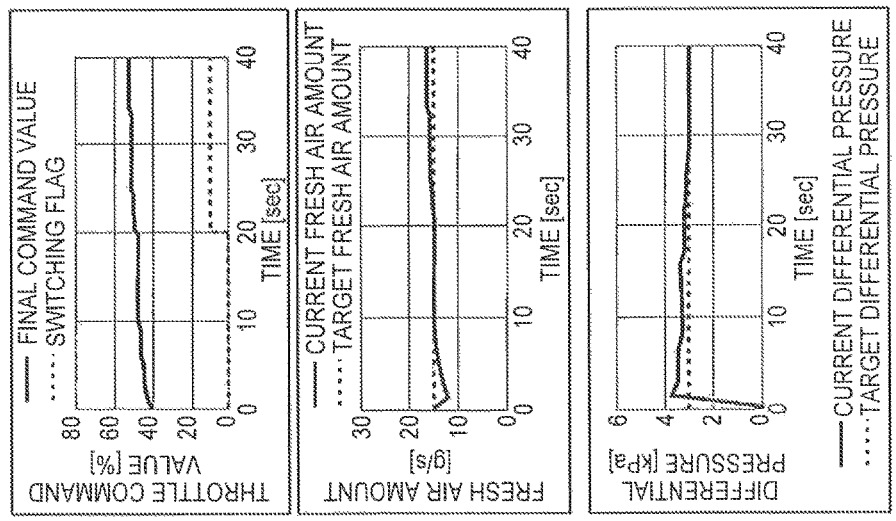

FIG. 14 is a graph group illustrating a calculation result according to Example 5. FIG. 14 shows a graph of the behavior of the throttle command value, a graph of the behavior of the fresh air amount, a graph of the behavior of the differential pressure, a graph of the behavior of FF term 1, a graph of the behavior of P term 1, a graph of the behavior of I term 1, a graph of the behavior of throttle command value 1, a graph of the behavior of P term 2, a graph of the behavior of I term 2, and a graph of the behavior of throttle command value 2. In Example 5, each gain of the FB control of the fresh air amount control and the differential pressure control is set as follows. Because of this setting, the FF control and PI control are performed in the fresh air amount control and the PI control is performed in the differential pressure control in Example 5.

Fresh air amount control: $P$ gain=0.2, $I$ gain=0.8, $D$ gain=0

Differential pressure control: $P$ gain=−1, $I$ gain=−3, $D$ gain=0

In Example 5, the fresh air amount control has no FF term, and thus throttle command value 1 immediately before the switching of the control algorithms is the previous value of I term 2 in the first control cycle after the switching. Throttle command value 1 immediately before the switching is 50%, and thus 50% is set as the previous value of I term 2 immediately after the switching and the value that is obtained by adding the update amount to 50% becomes I term 2 immediately after the switching.

The update amounts of P term 2 and I term 2, which are deviation-dependent terms, begin to be reflected in the throttle command value (throttle command value 1) immediately after the switching. Accordingly, no sudden change occurs in the throttle command value before and after the switching, as illustrated in the graph of the behavior of the throttle command value, although a change equivalent to the deviation-dependent term occurs before and after the switching. In addition, even in Example 5, the fresh air amount can be controlled to correspond to the target value until the switching of the control algorithms and the differential pressure can be controlled to correspond to the target value after the switching as illustrated in the graph of the behavior of the fresh air amount and the graph of the behavior of the differential pressure.

In Example 6, the invention is applied to the calculation of the command value pertaining to a case where the control algorithm associated with the throttle operation is switched from the fresh air amount control to the differential pressure control. Example 6 differs from Example 5 in terms of the control algorithm of the differential pressure control. The behaviors of the fresh air amount and the differential pressure that are illustrated in Example 6 are not those measured in the actual engine but those calculated by the use of a simulation model that is modeled after the engine.

Figure 15:
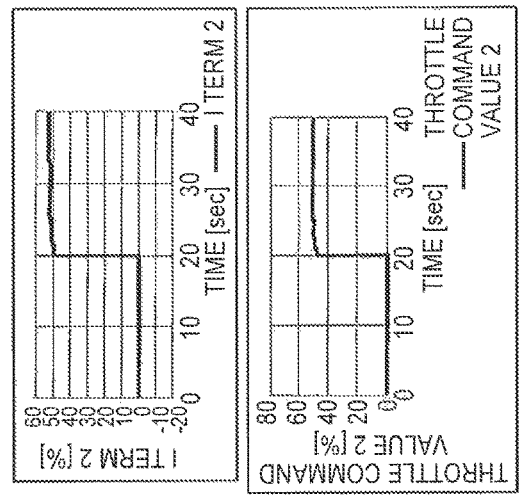
FIG. 15 is a graph group illustrating a calculation result according to Example 6.
Figure 15:
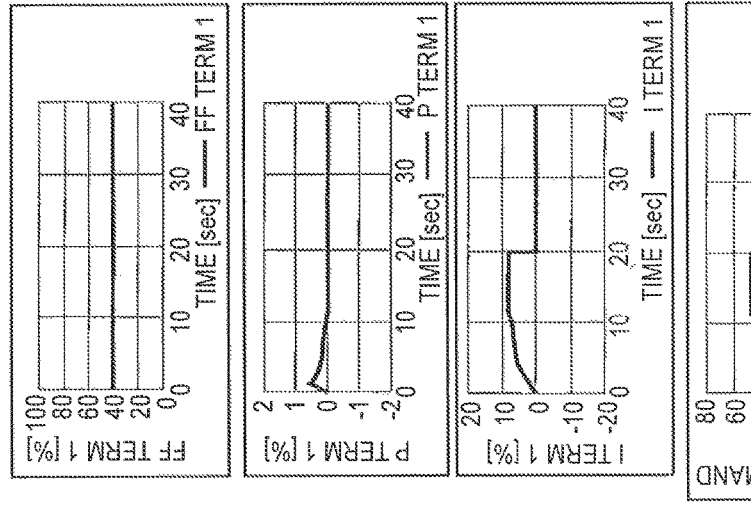
Figure 15:
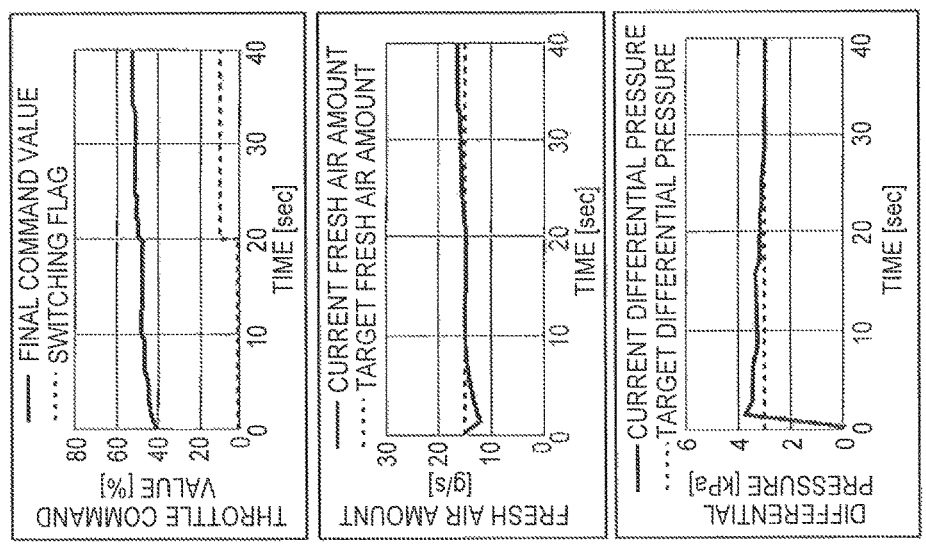

FIG. 15 is a graph group illustrating a calculation result according to Example 6. FIG. 15 shows a graph of the behavior of the throttle command value, a graph of the behavior of the fresh air amount, a graph of the behavior of the differential pressure, a graph of the behavior of FF term 1, a graph of the behavior of P term 1, a graph of the behavior of I term 1, a graph of the behavior of throttle command value 1, a graph of the behavior of I term 2, and a graph of the behavior of throttle command value 2. In Example 6, each gain of the FB control of the fresh air amount control and the differential pressure control is set as follows. Because of this setting, the FF control and PI control are performed in the fresh air amount control and only I control is performed in the differential pressure control in Example 6.

Fresh air amount control: $P$ gain=0.2, $I$ gain=0.8, $D$ gain=0

Differential pressure control: $P$ gain=0, $I$ gain=−3, $D$ gain=0

In Example 6, the value that is obtained by adding the update amount of I term 2 immediately after the switching to throttle command value 1 immediately before the switching of the control algorithms is throttle command value 2 immediately after the switching. Accordingly, no sudden change occurs in the throttle command value before and after the switching of the control algorithms, as illustrated in the graph of the behavior of the throttle command value, although a change equivalent to the update amount of I term 2 occurs. In addition, even in Example 6, the fresh air amount can be controlled to correspond to the target value until the switching of the control algorithms and the differential pressure can be controlled to correspond to the target value after the switching as illustrated in the graph of the behavior of the fresh air amount and the graph of the behavior of the differential pressure.

As is apparent from the calculation results according to the four embodiments described above, the invention can be applied to any control algorithm switching insofar as the control algorithm after the switching includes at least I control.

The invention can be applied to a control device for a spark ignition-type internal combustion engine as well as a control device for a compression ignition-type internal combustion engine. The controlled actuator is not limited to the examples described above insofar as two control algorithms are selectively applied to the actuator.

What is claimed is:

1. A control device for an internal combustion engine, the internal combustion engine including an actuator configured as a throttle placed in an intake passage of the internal combustion engine, the control device comprising:
   an electronic control unit configured to calculate a command value given to the actuator at a predetermined control cycle in accordance with a first control algorithm, wherein the electronic control unit is configured to calculate a command value given to the actuator at a predetermined control cycle in accordance with a second control algorithm,
wherein the second control algorithm differs from the first control algorithm, the second control algorithm including a feedforward control and a feedback control including an Integral (I) control and being in accordance with a deviation between a target value and a current value,
wherein the electronic control unit is configured to switch the control algorithms for the calculation of the command value of the actuator between the first control algorithm and the second control algorithm,
wherein the electronic control unit is configured to calculate a value obtained by adding a value of a term of the second control algorithm changing in accordance with the deviation calculated in a present control cycle to the command value calculated in a previous control cycle in accordance with the first control algorithm as a value of the command value calculated in the present control cycle in a first control cycle after switching from the first control algorithm to the second control algorithm, the value of the term changing in accordance with the deviation calculated in the present control cycle including an update amount of an Integral (I) term of the I control calculated in the present control cycle,
wherein the electronic control unit is configured to operate the actuator using the value of the command value calculated in the first control cycle after switching from the first control algorithm to the second control algorithm, and
wherein, in the first control cycle after the switching from the first control algorithm to the second control algorithm, the electronic control unit is configured to calculate a value as a previous value of the I term of the I control, the value being obtained by subtracting a current value of a feedforward term of the feedforward control from the command value calculated in the previous control cycle in accordance with the first control algorithm.

2. The control device according to claim 1,
wherein the feedback control includes a Proportional (P) control, and
wherein the term changing in accordance with the deviation includes a Proportional (P) term of the P control.

3. The control device according to claim 1,
wherein the feedback control includes a Derivative (D) control, and
wherein the term changing in accordance with the deviation includes a Derivative term of the D control.

4. The control device according to claim 1,
wherein the internal combustion engine is a compression ignition-type internal combustion engine,
wherein the first control algorithm is a control algorithm for calculating the command value given to the throttle such that an anterior/posterior differential pressure of the throttle corresponds to a target differential pressure, and
wherein the second control algorithm is a control algorithm for calculating the command value given to the throttle such that an amount of fresh air passing through the throttle corresponds to a target fresh air amount.

5. A control device for an internal combustion engine, wherein the internal combustion engine is a turbocharger-attached internal combustion engine including an actuator configured to control a flow rate of exhaust gas flowing into a turbine of the turbocharger, the control device comprising:
an electronic control unit configured to calculate a command value given to the actuator at a predetermined control cycle in accordance with a first control algorithm,
wherein the electronic control unit is configured to calculate a command value given to the actuator at a predetermined control cycle in accordance with a second control algorithm,
wherein the second control algorithm differs from the first control algorithm, the second control algorithm including a feedforward control and a feedback control including an Integral (I) control and being in accordance with a deviation between a target value and a current value,
wherein the electronic control unit is configured to switch the control algorithms for the calculation of the command value of the actuator between the first control algorithm and the second control algorithm,
wherein the electronic control unit is configured to calculate a value obtained by adding a value of a term of the second control algorithm changing in accordance with the deviation calculated in a present control cycle to the command value calculated in a previous control cycle in accordance with the first control algorithm as a value of the command value calculated in the present control cycle in a first control cycle after switching from the first control algorithm to the second control algorithm, the value of the term changing in accordance with the deviation calculated in the present control cycle including an update amount of an Integral (I) term of the I control calculated in the present control cycle,
wherein the electronic control unit is configured to operate the actuator using the value of the command value calculated in the first control cycle after switching from the first control algorithm to the second control algorithm,
wherein, in the first control cycle after the switching from the first control algorithm to the second control algorithm, the electronic control unit is configured to calculate a value as a previous value of the I term of the I control, the value being obtained by subtracting a current value of a feedforward term of the feedforward control from the command value calculated in the previous control cycle in accordance with the first control algorithm, and
wherein the first control algorithm is a control algorithm for calculating the command value given to the actuator such that any one control amount selected among an intake manifold pressure, an exhaust manifold pressure, a throttle upstream pressure, and a turbo efficiency corresponds to a target value of the control amount, and
wherein the second control algorithm is a control algorithm for calculating the command value given to the actuator such that any one control amount selected among the intake manifold pressure, the exhaust manifold pressure, the throttle upstream pressure, and the turbo efficiency and differing from the control amount of the first control algorithm corresponds to a target value of the control amount.

6. A control device for an internal combustion engine, the internal combustion engine including an actuator configured as a throttle placed in an intake passage of the internal combustion engine, the control device comprising:

a memory storing instructions; and
a processor configured to execute the instructions to:
calculate a command value given to the actuator at a predetermined control cycle in accordance with a first control algorithm;
calculate a command value given to the actuator at a predetermined control cycle in accordance with a second control algorithm, wherein the second control algorithm differs from the first control algorithm, the second control algorithm including a feedforward control and a feedback control including an Integral (I) control and being in accordance with a deviation between a target value and a current value;
switch the control algorithms for the calculation of the command value of the actuator between the first control algorithm and the second control algorithm;
calculate a value obtained by adding a value of a term of the second control algorithm changing in accordance with the deviation calculated in a present control cycle to the command value calculated in a previous control cycle in accordance with the first control algorithm as a value of the command value calculated in the present control cycle in a first control cycle after switching from the first control algorithm to the second control algorithm, the value of the term changing in accordance with the deviation calculated in the present control cycle including an update amount of an Integral (I) term of the I control calculated in the present control cycle;
operate the actuator using the value of the command value calculated in the first control cycle after switching from the first control algorithm to the second control algorithm; and
calculate, in the first control cycle after the switching from the first control algorithm to the second control algorithm, a value as a previous value of the I term of the I control, the value being obtained by subtracting a current value of a feedforward term of the feedforward control from the command value calculated in the previous control cycle in accordance with the first control algorithm.

7. The control device according to claim 6,
wherein the feedback control includes a Proportional (P) control, and
wherein the term changing in accordance with the deviation includes a Proportional (P) term of the P control.

8. The control device according to claim 6,
wherein the feedback control includes a Derivative (D) control, and
wherein the term changing in accordance with the deviation includes a Derivative (D) term of the D control.

9. The control device according to claim 6,
wherein the internal combustion engine is a compression ignition-type internal combustion engine,
wherein the first control algorithm is a control algorithm for calculating the command value given to the throttle such that an anterior/posterior differential pressure of the throttle corresponds to a target differential pressure, and
wherein the second control algorithm is a control algorithm for calculating the command value given to the throttle such that an amount of fresh air passing through the throttle corresponds to a target fresh air amount.

10. A control device for an internal combustion engine, wherein the internal combustion engine is a turbocharger-attached internal combustion engine including an actuator configured to control a flow rate of exhaust gas flowing into a turbine of the turbocharger, the control device comprising:
a memory storing instructions;
and a processor configured to execute the instructions to:
calculate a command value given to the actuator at a predetermined control cycle in accordance with a first control algorithm;
calculate a command value given to the actuator at a predetermined control cycle in accordance with a second control algorithm,
wherein the second control algorithm differs from the first control algorithm, the second control algorithm including a feedforward control and a feedback control including an Integral (I) control and being in accordance with a deviation between a target value and a current value;
switch the control algorithms for the calculation of the command value of the actuator between the first control algorithm and the second control algorithm;
calculate a value obtained by adding a value of a term of the second control algorithm changing in accordance with the deviation calculated in a present control cycle to the command value calculated in a previous control cycle in accordance with the first control algorithm as a value of the command value calculated in the present control cycle in a first control cycle after switching from the first control algorithm to the second control algorithm, the value of the term changing in accordance with the deviation calculated in the present control cycle including an update amount of an Integral (I) term of the I control calculated in the present control cycle;
operate the actuator using the value of the command value calculated in the first control cycle after switching from the first control algorithm to the second control algorithm; and
calculate, in the first control cycle after the switching from the first control algorithm to the second control algorithm, a value as a previous value of the I term of the I control, the value being obtained by subtracting a current value of a feedforward term of the feedforward control from the command value calculated in the previous control cycle in accordance with the first control algorithm,
wherein the first control algorithm is a control algorithm for calculating the command value given to the actuator such that any one control amount selected among an intake manifold pressure, an exhaust manifold pressure, a throttle upstream pressure, and a turbo efficiency corresponds to a target value of the control amount, and
wherein the second control algorithm is a control algorithm for calculating the command value given to the actuator such that any one control amount selected among the intake manifold pressure, the exhaust manifold pressure, the throttle upstream pressure, and the turbo efficiency and differing from the control amount of the first control algorithm corresponds to a target value of the control amount.

* * * * *